(12) United States Patent
Okamoto et al.

(10) Patent No.: US 10,979,581 B2
(45) Date of Patent: Apr. 13, 2021

(54) VOICE CONTROL DEVICE, PRINTING APPARATUS, CONTROL METHODS THEREOF, AND STORAGE MEDIUM

(71) Applicant: CANON KABUSHIKI KAISHA, Tokyo (JP)

(72) Inventors: Akira Okamoto, Kawasaki (JP); Takuho Taguchi, Kawasaki (JP); Ryohei Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/110,342

(22) Filed: Aug. 23, 2018

(65) Prior Publication Data

US 2019/0068810 A1    Feb. 28, 2019

(30) Foreign Application Priority Data

Aug. 31, 2017   (JP) .............................. JP2017-167753

(51) Int. Cl.
| | |
|---|---|
| *G06F 15/00* | (2006.01) |
| *H04N 1/00* | (2006.01) |
| *G06F 3/12* | (2006.01) |
| *G06F 3/16* | (2006.01) |

(52) U.S. Cl.
CPC ....... *H04N 1/00408* (2013.01); *G06F 3/1204* (2013.01); *G06F 3/1234* (2013.01); *G06F 3/167* (2013.01); *H04N 1/00403* (2013.01); *G06F 3/1287* (2013.01); *G06F 3/1292* (2013.01)

(58) Field of Classification Search
CPC ............ H04N 1/00408; H04N 1/00403; G06F 3/1204; G06F 3/1234; G06F 3/167; G06F 3/1287; G06F 3/1292
USPC ....................................................... 358/1.13
See application file for complete search history.

(56) References Cited

U.S. PATENT DOCUMENTS

| | | | | |
|---|---|---|---|---|
| 7,333,224 B2 * | 2/2008 | Gallacher | ............. | G06F 3/1207 235/461 |
| 2008/0195545 A1 * | 8/2008 | Motoyama | ............. | G06F 21/43 705/51 |
| 2009/0009789 A1 * | 1/2009 | Yoshida | ............. | G06F 3/1238 358/1.14 |
| 2013/0297320 A1 * | 11/2013 | Buser | ............. | G10L 17/22 704/275 |
| 2015/0178031 A1 * | 6/2015 | Kanamori | ............. | G06F 3/1288 358/1.15 |
| 2015/0348403 A1 * | 12/2015 | Berelejis | ............. | G08C 23/02 367/197 |

FOREIGN PATENT DOCUMENTS

JP    2016-170631 A    9/2016

* cited by examiner

*Primary Examiner* — Mark R Milia
(74) *Attorney, Agent, or Firm* — Canon U.S.A., Inc., IP Division

(57) ABSTRACT

In the case where a voice control device can communicate with a printing apparatus and a display apparatus, a user is provided with visual presentations of notifications on the display apparatus where print processing instructions are provided to the printing apparatus based on user instructions issued to the voice control device by voice.

20 Claims, 19 Drawing Sheets

FIG.6
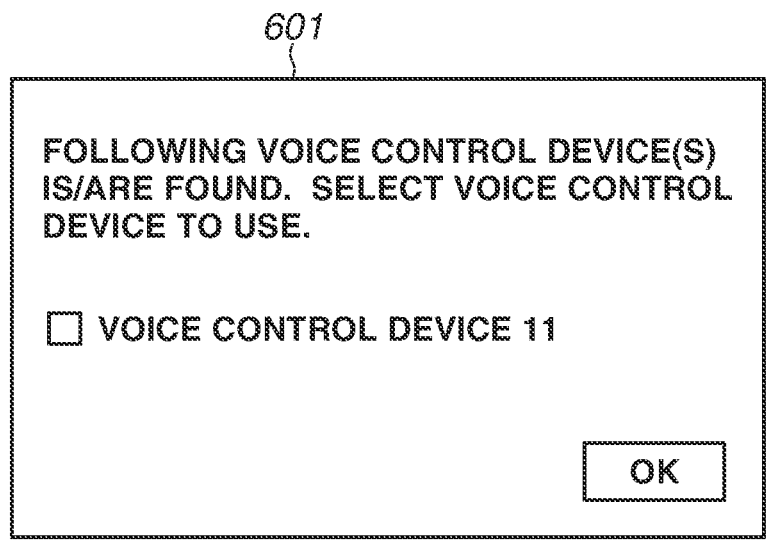
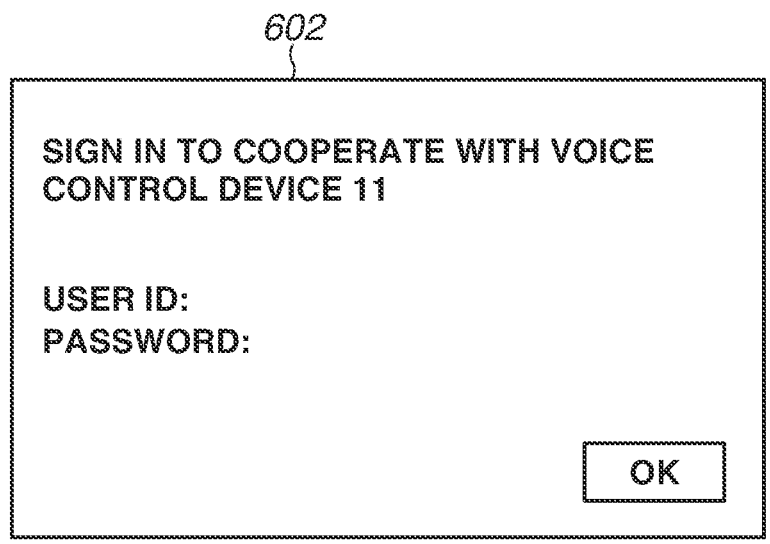

FIG.15

| MANUFACTURER | SERVER COOPERATION | SETTING METHOD | SERVER TO COOPERATE |
|---|---|---|---|
| A COMPANY | ○ | SCREEN DISPLAY | SERVER A |
| B COMPANY | ○ | INVITATION PAGE | SERVER B |
| C COMPANY | ○ | MOBILE TERMINAL | SERVER C |
| D COMPANY | × | × | × |
| E COMPANY | ○ | SCREEN DISPLAY | SERVER E |

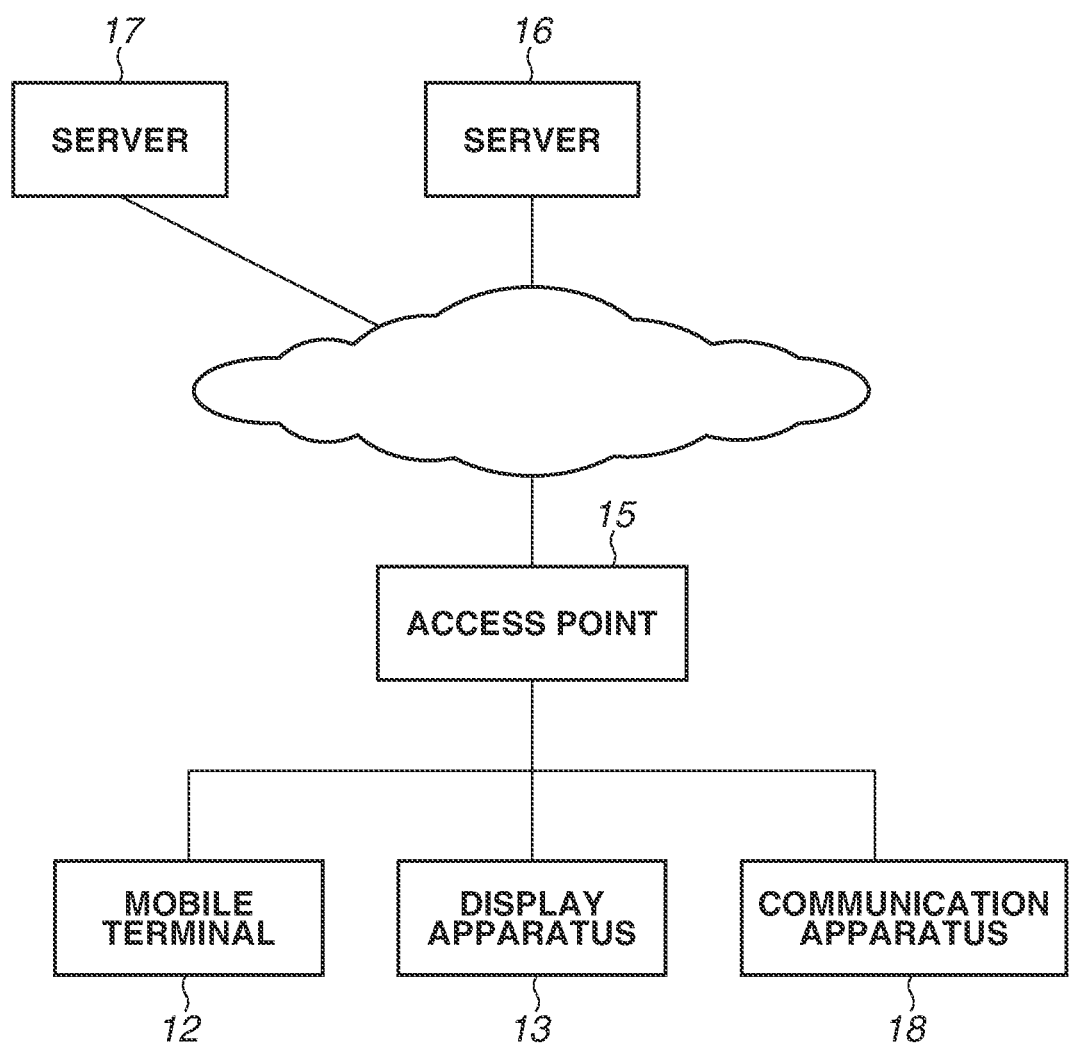

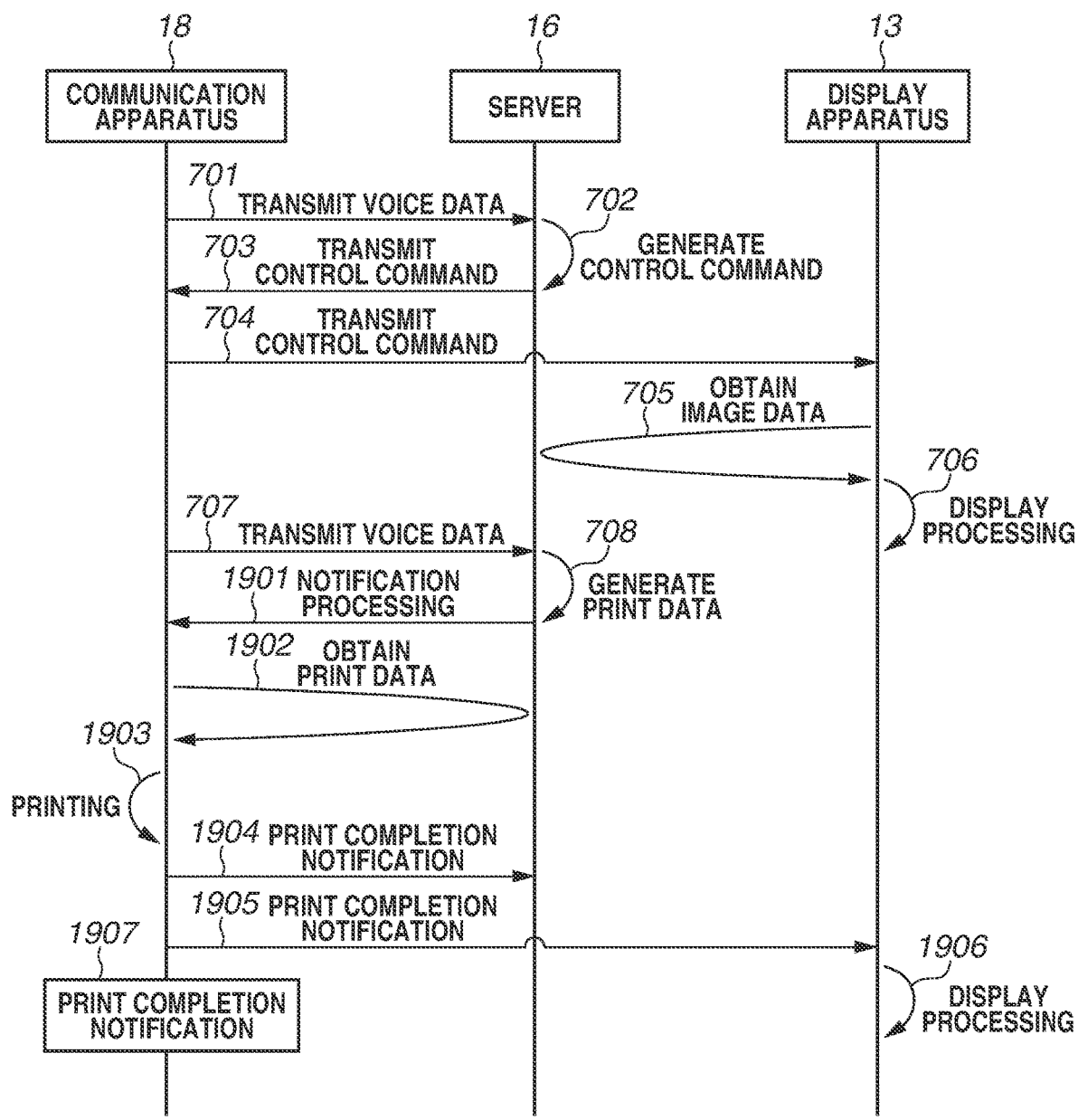

VOICE CONTROL DEVICE, PRINTING APPARATUS, CONTROL METHODS THEREOF, AND STORAGE MEDIUM

BACKGROUND

Field

The present disclosure relates to a server system, a printing apparatus, and a communication system.

Description of the Related Art

Japanese Patent Application Laid-Open No. 2016-170631 discusses a technique in which if an error occurs from a printer during printing based on a print job transmitted from an information processing apparatus, the state of the printer is displayed on a display unit of the information processing apparatus.

There is a configuration in which processing instructions are given to a communication apparatus based on user instructions that are issued to a voice control device by voice. In such a configuration, if a configuration in which the communication apparatus transmits a notification related to processing relating to which the communication apparatus is instructed to only the sender of the instruction is applied thereto, the content of the notification may fail to be visually presented to the user.

SUMMARY

The present disclosure is directed to facilitating visual presentation to the user of the content of a notification transmitted from a communication apparatus in a configuration in which processing instructions are given to the communication apparatus based on user instructions issued to a voice control device by voice.

According to an aspect of the present disclosure, a server system that communicates with a printing apparatus that performs print processing via the Internet includes a first transmission unit configured to transmit first information based on issuance of a print instruction by voice to a voice control device, the first information based on the print instruction and used in the print processing by the printing apparatus, an acquisition unit configured to obtain second information relating to the print processing, and a second transmission unit configured to transmit the second information, wherein the second information is transmitted to a display apparatus external to the voice control device and external to the printing apparatus via a wireless network, and wherein a screen based on the second information is displayed by the display apparatus.

According to another aspect of the present disclosure, a printing apparatus includes a reception unit configured to receive first information based on issuance of a print instruction to a voice control device by voice, the first information based on the print instruction, a print unit configured to perform print processing based on the received first information, and a unit configured to transmit second information relating to the print processing, wherein the second information is transmitted to a display apparatus external to the voice control device and external to the printing apparatus via a wireless network, and wherein a screen based on the second information is displayed by the display apparatus.

According to yet another aspect of the present disclosure, a system including a printing apparatus and a server system that communicates with the printing apparatus via the Internet includes a first transmission unit configured to transmit first information based on issuance of a print instruction to a voice control device by voice, the first information based on the print instruction, a print unit configured to perform n print processing based on the first information, an acquisition unit configured to obtain second information elating to the print processing, and a second transmission unit configured to transmit the second information, wherein the second information is transmitted to a display apparatus external to the voice control device and external to the printing apparatus via a wireless network, and wherein a screen based on the second information is displayed by the display apparatus.

Further features will become apparent from the following description of exemplary embodiments with reference to the attached drawings.

BRIEF DESCRIPTION OF THE DRAWINGS

FIG. 6 is a diagram illustrating examples of screens displayed by the communication apparatus.

FIG. 15 is a diagram illustrating an example of a table retained in the communication apparatus.

FIG. 18 illustrates an example of a system configuration diagram.

FIG. 19 is a sequence diagram related to print processing.

DESCRIPTION OF THE EMBODIMENTS

Figure 1:
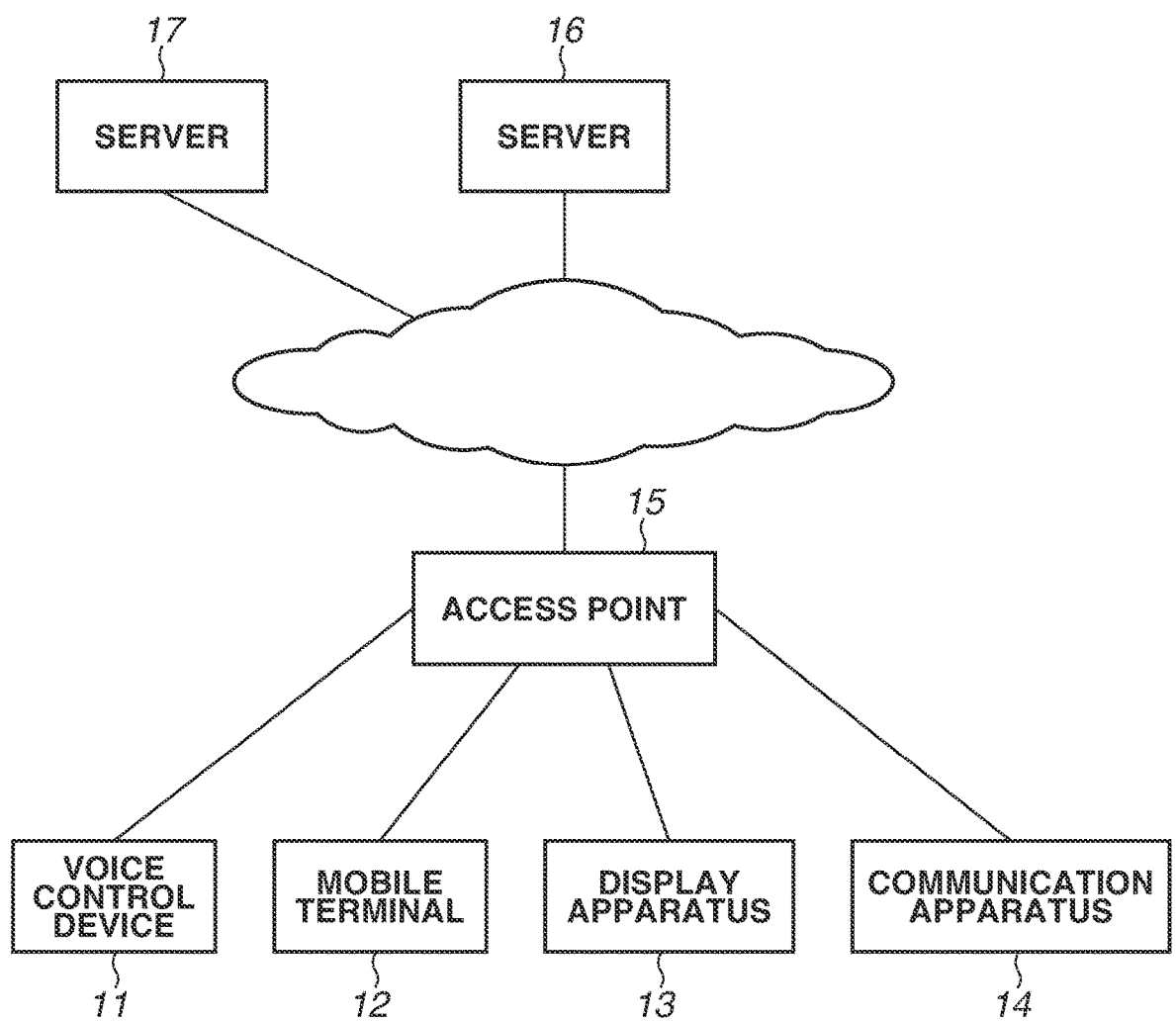
FIG. 1 is a diagram illustrating an example of a system configuration diagram.

FIG. 1 illustrates an example of a system configuration diagram according to a first exemplary embodiment. A system according to the present exemplary embodiment includes, for example, a voice control device 11, a mobile terminal 12, a display apparatus 13, a communication apparatus 14, an access point (AP) 15, and a server 16. An example of the voice control device 11 is a smart speaker. The mobile terminal 12 is an arbitrary mobile terminal such as a smartphone, a notebook personal computer (PC), a tablet terminal, or a personal digital assistant (PDA). In the following description, the mobile terminal 12 is a smartphone. The mobile terminal 12 may be referred to as a terminal apparatus. The display apparatus 13 can display a screen. Examples of the display apparatus 13 include a television set and a liquid crystal display. An example of the communication apparatus 14 is a printer. The communication apparatus 14 may be a copying machine, a facsimile apparatus, or a digital camera. The communication apparatus 14 may be a multifunction peripheral having a plurality of functions such as a copying function, a facsimile (FAX) function, and a print function. In the following description, the communication apparatus 14 is a printer such as an inkjet printer, a full-color laser beam printer, or a monochrome printer.

The voice control device 11 to the communication apparatus 14 can connect to (communicate with) the server 16 via the AP 15 and the Internet. The voice control device 11 to the communication apparatus 14 can also connect to (communicate with) each other via the AP 15.

Figure 2:
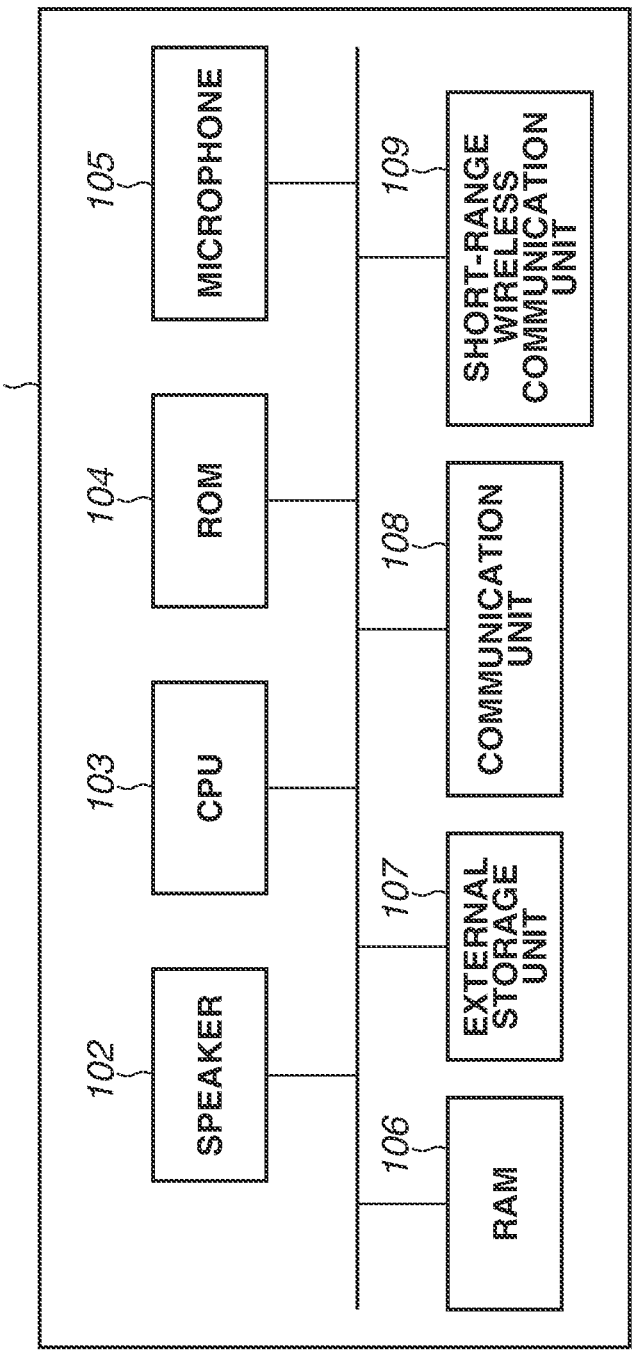
FIG. 2 is a diagram illustrating an example of a hardware configuration of a voice control device.

FIG. 2 is a hardware block diagram of the voice control device 11. The voice control device 11 includes a speaker 102, a central processing unit (CPU) 103, a read-only memory (ROM) 104, a microphone 105, a random access memory (RAM) 106, an external storage unit 107, a communication unit 108, and a short-range wireless communication unit 109. Blocks in FIGS. 2 to 4 and FIG. 8 are mutually connected, for example, by using an internal bus. Such configurations are just an example. Each apparatus may include pieces of hardware other than the illustrated ones. A plurality of blocks in FIGS. 2 to 4 and FIG. 8 may be integrated into one. A single block may be divided into two or more blocks. In other words, each apparatus may have any configuration as long as processing to be described below can be performed.

The speaker 102 issues voices by processing to be described below. The CPU 103 is a system control unit and controls the entire voice control device 11. The RUM 104 stores fixed data, including control programs to be executed by the CPU 103, a data table, and a built-in operating system (OS) program. In the present exemplary embodiment, the control programs stored in the ROM 104 are used to perform software execution controls, such as scheduling, task switching, and interrupt processing, under management of the built-in OS program stored in the ROM 104. The microphone 105 receives voices around the voice control device 11. For example, the microphone 105 receives voices issued by a user. The RAM 106 includes, for example, a static RAM (SRAM) which needs a backup power supply. The RAM 106 retains data by using a not-illustrated primary battery for data backup, and can thus store data such as program control variables in a nonvolatile manner. The RAM 106 also includes a memory area that stores setting information and management data of the voice control device 11. The RAM 106 is also used as a main memory and a work memory of the CPU 103. The external storage unit 107 stores application software.

The communication unit 108 includes a circuit and an antenna for performing communication according to a predetermined wireless communication method. For example, the communication unit 108 can wirelessly connect to the AP 15. The communication unit 108 may also operate as an AP for temporary use. The AP 15 may be a device such as a wireless local area network (LAN) router, for example. The wireless communication used in the present exemplary embodiment may be capable of operation according to a wireless communication method of a wireless LAN compliant with the Institute of Electrical and Electronics Engineers (IEEE) 802.11 standard series. The wireless communication may be capable of operation according to other wireless communication methods.

The short-range wireless communication unit 109 performs short-range wireless communication with other apparatuses that lie within a certain short distance from the voice control device 11. The short-range wireless communication unit 109 performs communication by a wireless communication method different from that of the communication unit 108. In the present exemplary embodiment, the short-range wireless communication unit 109 operates according to the Bluetooth (registered trademark) standard. In the present exemplary embodiment, the wireless communication using the communication unit 108 has a communication speed higher than that of the short-range wireless communication using the short-range wireless communication unit 109. In the present exemplary embodiment, the less communication using the communication unit 108 has a communication distance longer than that of the short-range wireless communication using the short-range wireless communication unit 109. The same applies to the communication units and short-range wireless communication units of other apparatuses to be described below.

Figure 3:
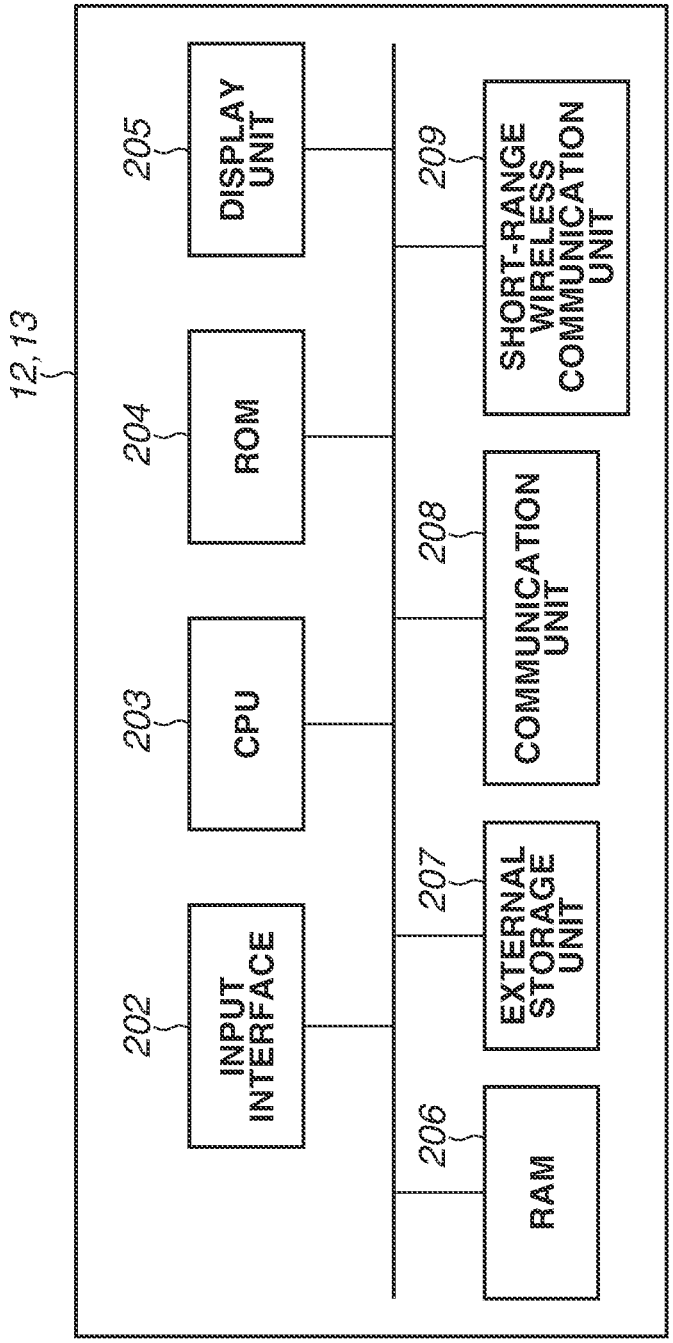
FIG. 3 is a diagram illustrating an example of a hardware configuration of a mobile terminal and a display apparatus.

FIG. 3 is a hardware block diagram of the mobile terminal 12 and the display apparatus 13. For example, the mobile terminal 12 and the display apparatus 13 each include an input interface 202, a CPU 203, a ROM 204, a display unit 205, a RAM 206, an external storage unit 207, a communication unit 208, and a short-range wireless communication unit 209. Such blocks are connected to each other, for example, by using an internal bus.

The CPU 203 is a system control unit and controls the entire apparatus. The RAM 206 includes, for example, a dynamic RAM (DRAM) which needs a backup power supply, like the RAM 106. The RAM 206 is also used as a main memory and a work memory of the CPU 203. The RAM 204 stores fixed data, such as a control program to be executed by the CPU 203, a data table, and an OS program.

The display unit 205 displays various types of information and various screens. The display unit 205 may include a touch display and have a function of accepting various inputs from the user. In other words, the display unit 205 may be an interface for accepting data inputs and operation instructions from the user, or an operation panel including a physical keyboard, buttons, and/or a touch panel. The communication unit 208 has a function similar to that of the communication unit 108 described above, and can wirelessly connect to other apparatuses via the AP 15. The short-range wireless communication unit 209 is a device that can perform short-range wireless communication with the short-range wireless communication unit 109 by using the same wireless communication method as the short-range wireless communication unit 109.

Figure 4:
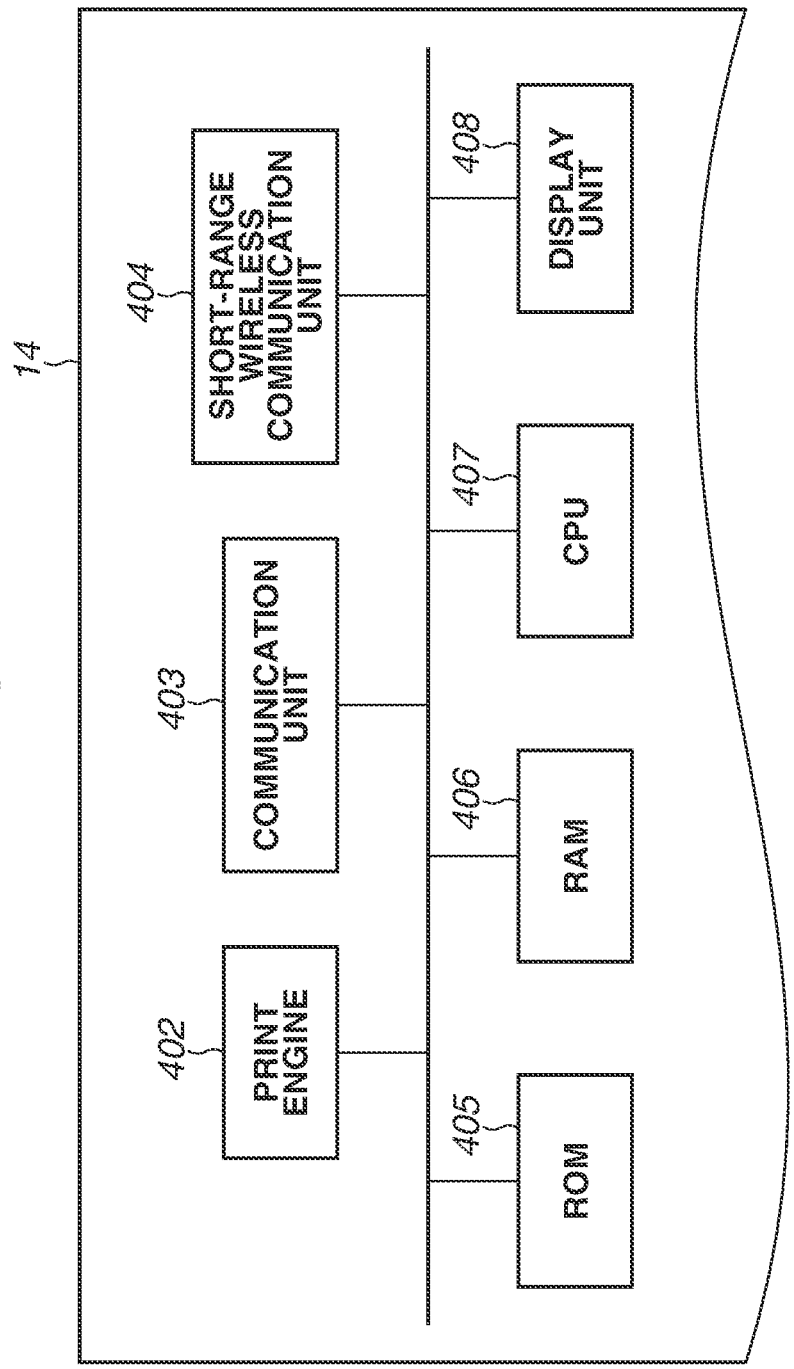
FIG. 4 is a diagram illustrating an example of a hardware configuration of a communication apparatus.

FIG. 4 is a hardware configuration diagram of the communication apparatus 14. The communication apparatus 14 includes, tier example, a print engine 402, a communication unit 403, a short-range wireless communication unit 404, a ROM 405, a RAM 406, a CPU 407, and a display unit 408.

The CPU 407 is a system control unit and controls the entire communication apparatus 14. The RAM 406 includes, for example, a DRAM which needs a backup power supply, like the RAM 106. The RAM 406 is also used as a main memory and a work memory of the CPU 407. The ROM 405 store fixed data, such as a control program to be executed by the CPU 407, a data table, and an OS program.

The communication unit 403 has a function similar to that of the communication unit 108 described above, and can wirelessly connect to other apparatuses via the AP 15. The short-range wireless communication unit 404 is a device that can perform short-range wireless communication with the short-range wireless communication unit 109 by using the same wireless communication method as the short-range wireless communication unit 109.

The print engine 402 forms an image on a recording medium, such as paper, by using a recording agent, such as ink, to output a print result, based on a print job received via the communication unit 403.

The display unit 408 displays various types of information and various screens. The display unit 408 may include a touch display and have a function of accepting various inputs from the user. In other words, the display unit 408 may be an interface for accepting data inputs and operation instructions from the user, or an operation panel including a physical keyboard, buttons, and/or a touch panel.

Figure 5:
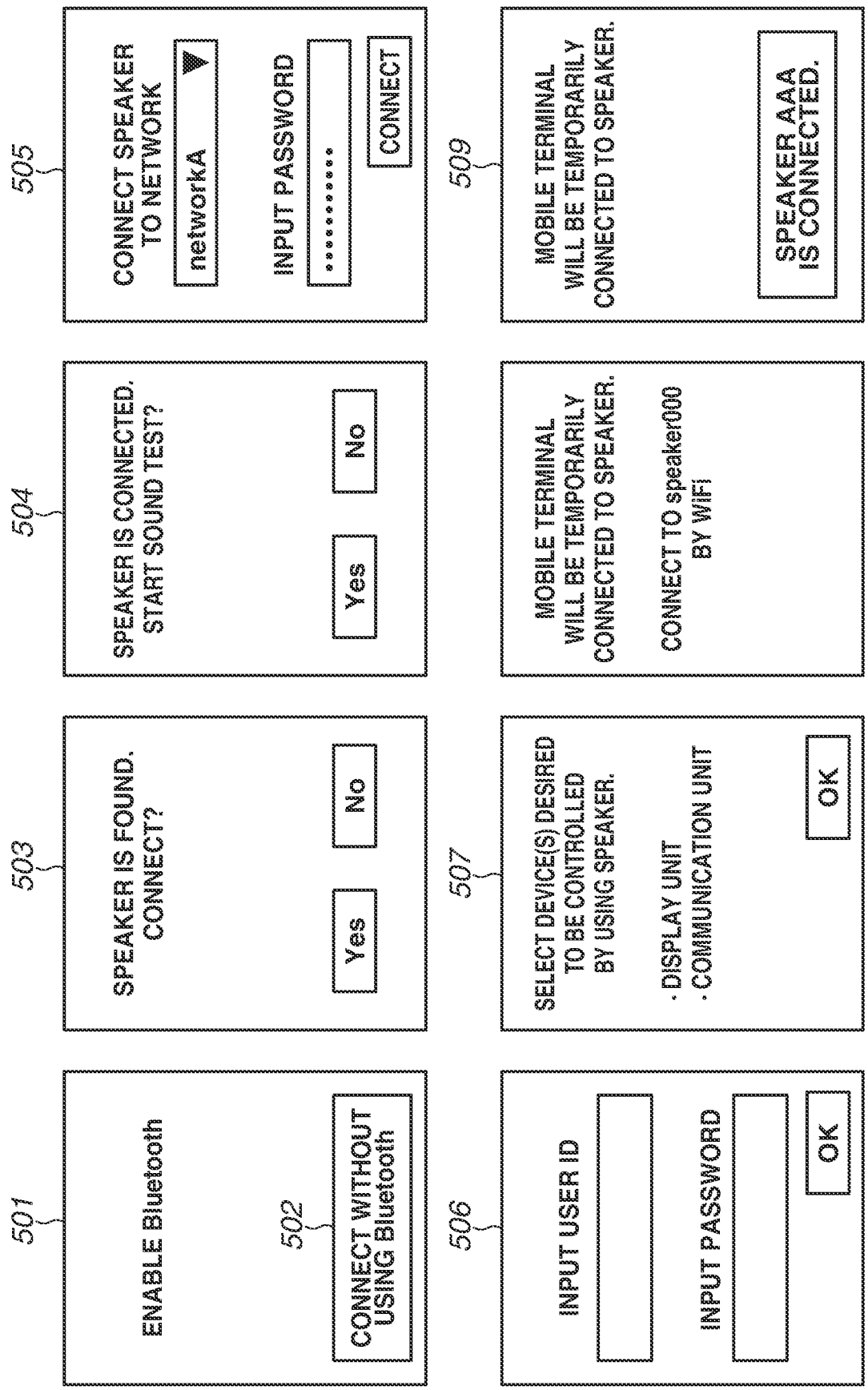
FIG. 5 is a diagram illustrating examples of screens related to a setup of the voice control device.

Next, a setup of the voice control device 11 will be described. FIG. 5 illustrates examples of screens which the mobile terminal 12 displays for the setup of the voice control device 11.

A management application for the voice control device 11 is installed on the mobile terminal 12 in advance.

If the user activates the management application, a screen 501 is displayed on the display unit 205 of the mobile terminal 12. The user here enables the short-range wireless communication unit 209 (for example, Bluetooth) of the mobile terminal 12 according to a message written on the screen 501. If the voice control device 11 is activated, the voice control device 11 issues a beacon including a specific identifier. If the mobile terminal 12 detects the beacon issued from the voice control device 11 by using the management application, the mobile terminal 12 displays a screen 503. If the "Yes" button is pressed on the screen 503, the mobile terminal 12 and the voice control device 11 establish a short-range wireless connection therebetween. If the short-range wireless connection between mobile terminal 12 and the voice control device 11 is established, a screen 504 is displayed on the display unit 205 of the mobile terminal 12. If the user here presses the "Yes" button on the screen 504, voice data is transmitted from the mobile terminal 12 to the voice control device 11 via the short-range wireless connection, and a voice is output from the speaker 102 of the voice control device 11. If the voice is output from the voice control device 11, the user presses a "test completion button" displayed subsequent to the screen 504, whereby a screen 505 is displayed on the display unit 205 of the mobile terminal 12. The user here inputs to into the screen 505 a service set identifier (SSID) and a password of an AP desired to connect the voice control device 11, and presses the connect button. Using the screen 505, the user basically inputs the SSID and password of the AP 1.5 to which the mobile terminal 12 is wirelessly connected by using the communication unit 208. By such processing, the mobile terminal 12 transmits the SSID and the password to the voice control device 11 via the short-range wireless connection. The voice control device 11 establishes a wireless connection with the AP 15 by using the SSID and password received via the short-range wireless connection. The processing so far enables the voice control device 11 and the mobile terminal 12 to wirelessly communicate via the AP 15. The user then inputs a user ID and a password for logging in to the server 16 by using a screen 506 displayed on the mobile terminal 12. The user ID and password input from the screen 506 are transmitted from the mobile terminal 12 to the voice control device 11 via the short-range wireless connection or the AP 15. The voice control device 11 signs in on the server 16 by using the user ID and password received from the mobile terminal 12. Here, the voice control device 11 also transmits its own media access control (MAC) address. This enables the voice control device 11 to use services that the server 16 provides for the user. More specifically, the server 16 manages the MAC address of the voice control device 11 and the user ID in association with each other. The voice control device 11 here may receive an access token from the server 16. Using a screen 507 displayed subsequent to the screen 506, the user selects a device or devices desired to be controlled by using the voice control device 11 (hereinafter, control target device (s)). Suppose here that the user selects the display apparatus 13 and the communication apparatus 14. The apparatuses to be displayed on the screen 507 are devices searched for by the mobile terminal 12 via the AP 15. As a result of the device search processing, the mobile terminal 12 obtains information such as the MAC addresses and Internet Protocol (IP) addresses of the respective apparatuses at the time of the device search, and services that the apparatuses can provide. If the OK button is pressed on the screen 507, the mobile terminal 12 transmits the foregoing information about the apparatuses to the voice control device 11. The voice control device 11 may subsequently transmit the received information about the apparatuses to the server 16. Receiving the information, the server 16 may further link the received information about the apparatuses with the user ID with which information about the voice control device 11 is linked. With such a configuration, the server 16 can recognize what kinds of apparatuses are included in the network to which the voice control device 11 belongs, i.e., the network of the apparatuses connected to the AP 15.

The setup of the voice control device 11 may be performed by using a different method. For example, if the voice control device 11 is activated (or a setup mode is enabled), the communication unit 108 of the voice control device 11 operates as a software AP. For example, if "connect without using Bluetooth" 502 is pressed on the screen 501, the mobile terminal 12 establishes a wireless connection with the voice control device 11 by using the communication unit 208. If, for example, the communication unit 208 of the mobile terminal 12 is already connected to the AP 15, the mobile terminal 12 switches the connection of the communication unit 208 from the AP 15 to the software AP of the communication unit 108 of the voice control device 11 according to the user's operation or instructions from the management application. If a wireless connection is established between the communication unit 208 of the mobile terminal 12 and the communication unit 108 of the voice control device 11, a screen 509 is displayed. In subsequent processing, the information input to the screen 505 is transmitted via the wireless connection established between the communication unit 208 of the mobile terminal 12 and the communication unit 108 of the voice control device 11. The mobile terminal 12 then switches the connection to the AP 15 so that the mobile tell terminal 12 and the voice control device 11 perform wireless communication via the AP 15. The voice control device 11 disables the software AP, and wirelessly connects to the AP 15 by using the communication unit 108.

As described above, the voice control device 11 can perform the first reception processing for receiving the information (SSID and password) relating to the external AP 15 from the mobile terminal 12 by wireless communication via the AP provided by the voice control device 11. The voice control device 11 can further perform the second reception processing for receiving the information (SSID and password) relating to the external AP 15 from the mobile terminal 12 via short-range wireless communication. The voice control device 11 may have either one of the two reception processing functions described above, or both the reception processing functions. The voice control device 11 may connect to the external AP 15 by using other reception processing functions.

Next, the processing for the communication apparatus 14 to sign in on the server 16 will be described. For example, there are two servers on the Internet, the server 16 corresponding to the voice control device 11 and a server 17 not corresponding to the voice control device 11. In order for the voice control device 11 and the communication apparatus 14 to cooperate, the communication apparatus 14 needs to sign in on not the server 17 but the server 16.

The communication apparatus 14 then has a voice control device cooperation mode. If the voice control device cooperation mode is enabled, the communication apparatus 14 performs a device search on the network that the communication apparatus 14 joins, to find the voice control device 11. Since the voice control device 11 is found, a screen 601 in FIG. 6 is displayed on the display unit 408 of the communication apparatus 14. If the user presses the OK button on the screen 601, a screen 602 is displayed on the display unit 408 of the communication apparatus 14. Information obtained by the device search includes, for example, a Uniform Resource Locator (URL) of the server 16 corresponding to the voice control device 11. By using the URL, the communication apparatus 14 can display the screen 602 for signing in on the server 16. The communication apparatus 14 can sign in on the server 16 by using information input to the screen 602. Such processing enables the communication apparatus 14 to handle image data managed by the server 16.

If a voice control device corresponding to the server 17 is found by the device search of the communication apparatus 14, the communication apparatus 14 displays a screen for signing in on the server 17.

Different processing may be performed as the processing for the communication apparatus 14 to sign in on the server 16. An example of the different processing will be described. Suppose initially that the sign-in of the mobile terminal 12 on the server 16 has been completed. For example, suppose that the user has signed in on the server 16 by using the foregoing screen 506. If the mobile terminal 12 detects the communication apparatus 14 via the AP 15, the mobile terminal 12 displays identification information and a registration button of the communication apparatus 14. For example, the registration button may be displayed next to the communication apparatus on the screen 507. If the user here presses the registration button, a registration request is transmitted from the mobile terminal 12 to the communication apparatus 14. The registration request includes destination information about the server 16. Receiving the registration request, the communication apparatus 14 displays a selection screen relating to whether to perform printer registration processing, on the display unit 408 of the communication apparatus 14. If the user here selects to perform the registration processing, the communication apparatus 14, according to the designation information included in the registration request, transmits a registration request including the MAC address of the communication apparatus 14 to the server 16. The communication apparatus 14 then receives a response to the registration request, from the server 16. The response includes a URL related to the registration processing of the communication apparatus 14. The URL is a dedicated URL related to the registration processing of the communication apparatus 14. The communication apparatus 14 transmits the response received from the server 16 to the mobile terminal 12. The mobile terminal 12 transmits a registration request to the server 16 by using the URL included in the received response. The registration request includes the user ID and the password which are already input to the mobile terminal 12 to sign in on the server 16. If the correct user ID and password are received, the server 16 receiving the registration request transmits a response indicating a success of the registration request to the mobile terminal 12. In other words, since the registration request is received by using the dedicated URL related to the registration processing of the communication apparatus 14, the server 16 here provisionally registers the communication apparatus 14 as a user printing apparatus signed in on the mobile terminal 12. That is, the server 16 manages the user ID and the MAC address of the communication apparatus 14 in association with each other. The mobile terminal 12 transmits information indicating the completion of registration to the communication apparatus 14. If the communication apparatus 14 receives the completion information, the communication apparatus 14 transmits a registration request including the MAC address of the communication apparatus 14 to the server 16. The server 16 identifies that the communication apparatus 14 is in a provisionally registered state, and returns a registration completion response. By such processing, the server 16 registers the communication apparatus 14 as the user printing apparatus signed in on the mobile terminal 12. If the communication apparatus 14 receives the registration completion response from the server 16, the communication apparatus 14 transmits information indicating the completion of registration to the mobile terminal 12. By the foregoing processing, the communication apparatus 14 may become able to handle the image data managed by the server 16.

Now, a challenge to the present exemplary embodiment will be described. The communication apparatus 14 usually transmits a notification to only an apparatus that has instructed the communication apparatus 14 to perform printing. For example, in a configuration where an apparatus such as a PC or a smartphone instructs the communication apparatus 14 to perform printing, the apparatus can present the content of the notification transmitted from the communication apparatus 14 to the user by using the display unit included therein. However, in the present exemplary embodiment where printing is performed based on voices that the user issues to the voice control device 11, the voice control device 11 or the server 16 instructs the communication apparatus 14 to perform printing as will be described below. Such apparatuses may not include a display unit for presenting information to the user. If the configuration in which the notification is transmitted to only an apparatus that has instructed the communication apparatus 14 to perform printing is applied to the configuration for performing printing via the voice control device 11, the content of the notification which the communication apparatus 14 transmits may fail to be visually presented to the user. Even if the voice control device 11 includes a display unit, the user may be near the display apparatus 13 and not near the voice control device 11. In such a case, the content can fail to be presented to the user. Then, a configuration for facilitating the visual presentation of the content of the notification transmitted by the communication apparatus 14 to the user even if the communication apparatus 14 is instructed to perform printing by a user instruction (voice) to the voice control device 11 will be described.

Figure 7:
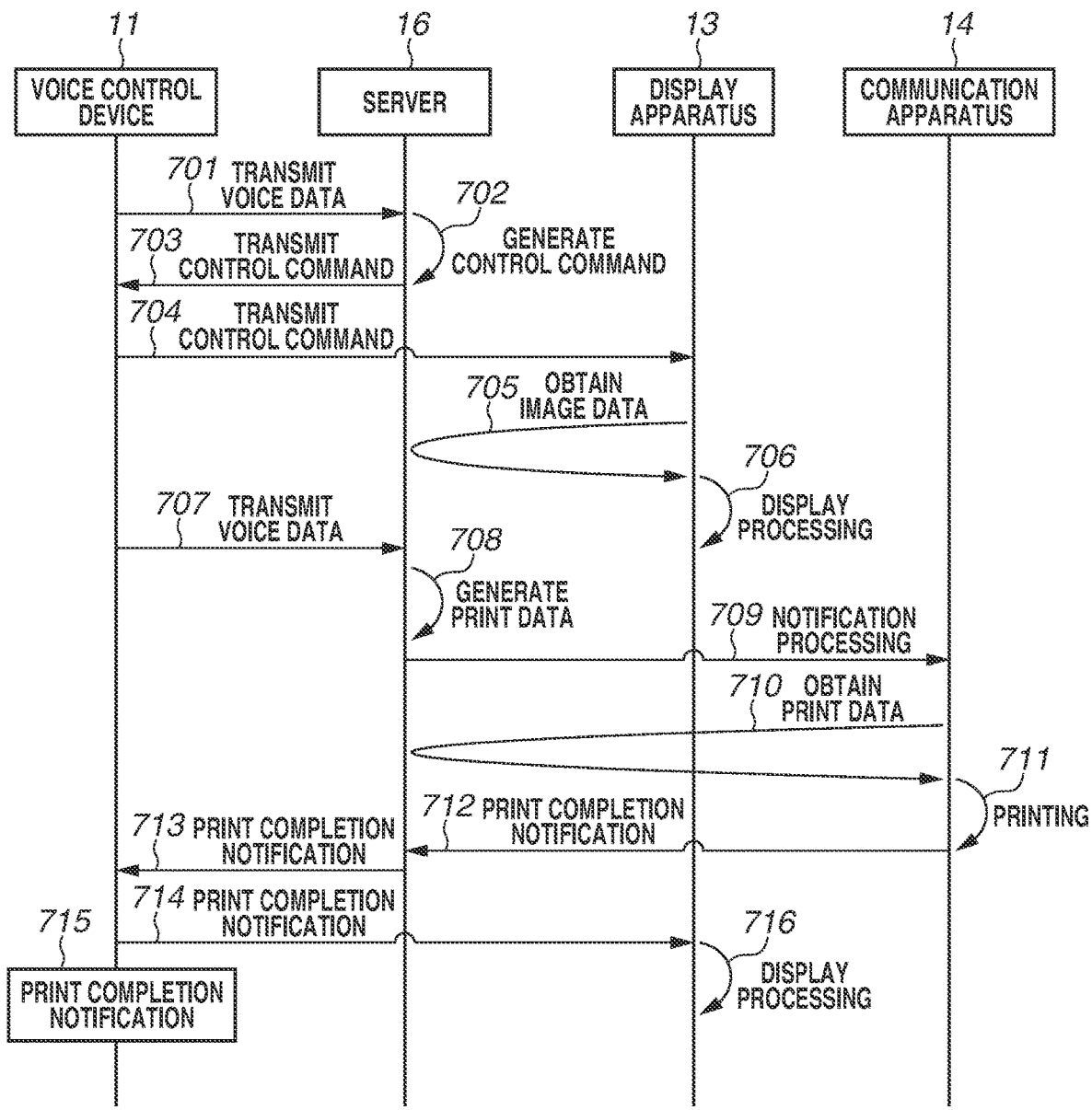
FIG. 7 is a sequence diagram related to print processing.

FIG. 7 is a sequence diagram for describing processing in which the communication apparatus 14 performs print processing based on a print instruction that the voice control device 11 issues according to a voice issued from the user. Suppose that the display apparatus 13 has also already signed in on the server 16. The server 16 stores image data corresponding to a picture A to be described below for the user's use. Communications between the apparatuses are performed via the AP 15.

The user initially speaks a wake word, which is a predetermined keyword, near the voice control device 11, and then speaks what the user himself/herself wants to do. For example, the user says "display the picture A" after the wake word.

Receiving the voice of the wake word, the voice control device 11 receives the subsequently spoken voice. Specifically, the voice control device 11 receives the voice "display the picture A".

In processing 701, the voice control device 11 transmits to the server 16 the identification information (such as MAC address) relating to the voice control device 11 and voice data based on the received voice.

The server 16 recognizes that the voice control device 11 is a signed-in device, by identifying from the MAC address of the voice control device 11 the user ID associated with the MAC address. The access token mentioned above may be used. In processing 702 and 703, the server 16 analyzes the voice data transmitted from the voice control device 11, generates a control command based on the voice data, and transmits the control command to the voice control device 11. The control command includes a display processing command as the content of processing to be performed, and information indicating the storage location of the image data corresponding to the picture A to be displayed.

The voice control device 11 selects a transmission destination of the control command received from the server 16. Since the user has said "display the picture A" as a request from the user, the voice control device 11 refers to the devices to be controlled, and selects one of the devices, i.e., the display apparatus 13 having a display service (function) as the transmission destination. In processing 704, the voice control device 11 transmits the control command to the selected display apparatus 13. Alternatively, the devices to be controlled may be referred to and the transmission destination may be selected by the server 16. In such a case, the server 16 transmits the control command including the information relating to the selected transmission destination, to the voice control device 11.

The method by which the voice control device 11 selects the s destination here is not limited to the foregoing.

For example, the user may specify the display destination of the picture A by voice. In such a case, the server 16 receiving the voice data searches for the display destination specified by the user from among the apparatuses linked with the same user ID as the voice control device 11 is. If the display destination specified by the user is found, the server 16 transmits a control command including display destination information relating to the display destination specified by the user. The voice control device 11 selects the transmission destination based on the display destination information included in the control command.

For example, the voice control device 11 or the server 16 performs a broadcast for searching for devices having a display service on the network to which the voice control device 11 belongs. The voice control device 11 or the server 16 then selects an apparatus responding to the broadcast as the transmission destination.

While the voice control device 11 transmits, in processing 704, the control command received from the server 16, the voice control device 11 may transmit a different command instead. More specifically, the voice control device 11 may generate a different command based on the control command received in processing 703, and transmit the generated different command to the display apparatus 13. In subsequent processing in which the voice control device 11 is described to transmit a control command (for example, processing 704 in FIG. 10), a different command generated based on the control command may be similarly transmitted. In such a case, the apparatus receiving the command can perform processing according to the different command.

The display apparatus 13 performs processing according to the control command. In processing 705, the display apparatus 13 initially accesses the storage location included in the control command, and obtains the image data corresponding to the picture A from the storage location. In processing 706, the display apparatus 13 displays the image data corresponding to the picture A. If the control commands includes a URL corresponding to the picture A, the display apparatus 13 may access the URL to display a web page including the picture A.

Then, the user initially speaks the wake word near the voice control device 11, and then speaks what the user himself/herself wants to do. For example, the user says "print the picture A displayed on the display apparatus 13" after the wake word.

Receiving the voice of the wake word, the voice control device 11 receives the subsequently spoken words. Specifically, the voice control device 11 accepts a print instruction by voice by receiving the voice "print the picture A displayed on the display apparatus 13".

In processing 707, the voice control device 11 transmits the voice data to the server 16. The basic processing is similar to that of processing 701.

The server 16 analyzes the voice data transmitted from the voice control device 11, and performs processing based on the voice data. Since the server 16 receives the voice data of the voice "print the picture A displayed on the display apparatus 13", the server 16, in processing 708, generates print data based on the image data corresponding to the picture A. In processing 708, a server different from the server 16 may generate the print data. For example, the manufacturer of the communication apparatus 14 may provide a print server including software for generating print data. The server 16 then requests the print server to generate the print data, and the print server generates the print data.

In processing 709, the server 16 completes the generation of the print data, and transmits a notification indicating the completion of generation of the print data to the communication apparatus 14.

If the communication apparatus 14 receives the notification indicating the completion of generation of the print data, then in processing 710 and 711, the communication apparatus 14 accesses the server 16 to obtain the print data and performs printing.

If the print processing is completed, then in processing 712, the communication apparatus 14 transmits a print completion notification to the server 16. In processing 713, the server 16 transmits the print completion notification to the voice control device 11.

If the voice control device 11 receives the print completion notification, the voice control device 11 identifies the display apparatus 13 having been displaying the image to be printed according to the control command transmitted in processing 704. In processing 714, the voice control device 11 transmits the print completion notification to the identified display apparatus 13.

If the voice control device 11 receives the print completion notification, then in processing 714, the voice control device 11 further notifies the user of the completion of printing by voice.

If the voice control device 11 can identify the name of the user who has requested the printing from the voice "print the picture A displayed on the display apparatus 13", the voice control device 11 may generate the voice data with the username attached. By such processing, the communication apparatus 14 can display the username during execution of print processing 711 or as a print history.

After the notification of the completion of printing and before an instruction to perform printing by using different print data, the user initially speaks the wake word near the voice control device 11, and then speaks what the user himself herself s to do. For example, the user speaks instructions for extra copies, like "one more sheet" or "print three more copies", after the wake word.

Receiving instructions for extra copies, the voice control device 11 may retransmit the voice data transmitted in processing 707. Here, the voice data corresponding to "one more sheet" or "print three more copies" is also transmitted. Receiving the two pieces of voice data, the server 16 performs print data generation processing similar to that of processing 708. The server 16 then sets the number of copies based on the voice data of the new request. By such processing, the user can easily give instructions for reprinting by using the same print data. After the notification of the completion of printing and before an instruction to perform printing by using different print data, the user further speaks the wake word near the voice control device 11, and then speaks what the user himself/herself wants to do. For example, the user says "print it on a larger sheet" after the wake word.

Receiving the instruction, the voice control device 11 may retransmit the voice data transmitted in processing 707. Here, the voice data corresponding to "print it on a larger sheet" is also transmitted. Receiving the two pieces of voice data, the server 16 performs print data generation processing similar to that of processing 708. The server 16 then sets a sheet size based on the voice data of the new request. By such processing, the user can easily give instructions to print the same image data on a different size of sheet. As will be described below, in a case where another apparatus generates the print data, similar processing may be performed by the apparatus that generates the print data.

The voice control device 11 may perform processing 714 and processing 715 in reverse order.

If the display apparatus 13 receives the print completion notification, then in processing 716, the display apparatus 13 displays a screen for notifying the user of the completion of printing, including a message indicating the completion of printing, on the display unit 205 (display processing). In such a manner, processing for notifying the user of the completion of printing can be performed by an apparatus other than the apparatus (voice control device 11 or server 16) that has instructed the communication apparatus 14 to perform the printing.

The print completion notification that triggers the display processing may be transmitted from the server 16 to the display apparatus 13. In such a case, the server 16, receiving the print completion notification in processing 712, identifies the apparatus (display apparatus 13) having been displaying the image to be printed according to the control command generated in processing 702. If the server 16 has instructed the voice control device 11 about the transmission destination of the control command, the server 16 here identifies the transmission destination as the apparatus having been displaying the image to be printed according to the control command generated in processing 702. The server 16 may identify an apparatus having a display service among the apparatuses linked with the same user ID as the voice control device 11 is, as the apparatus having been displaying the image to be printed according to the control command generated in processing 702. The server 16 transmits the print completion notification to the apparatus thus identified.

The print completion notification that triggers the display processing may be transmitted from the communication apparatus 14 to the display apparatus 13. In such a case, the voice control device 11 or the server 16 identifies an apparatus having a display service among the apparatuses linked with the same user ID as the voice control device 11 is, as the transmission destination of the print completion notification. The voice control device 11 or the server 16 may identify the apparatus having been displaying the image to be printed according to the control command generated in processing 702. The voice control device 11 may identify an apparatus having a display service from among the apparatuses to be controlled. The voice control device 11 or the server 16 may perform a broadcast for searching for an apparatus having a display service on the network it belongs, and identifies an apparatus responding to the broadcast. The apparatus thus identified serves as the transmission destination of the print completion notification. The voice control device 11 or the server 16 then transmits information relating to the transmission destination of the print completion notification (display apparatus 13) to the communication apparatus 14. The communication apparatus 14 transmits the print completion notification to the display apparatus 13 based on the received information.

Figure 8:
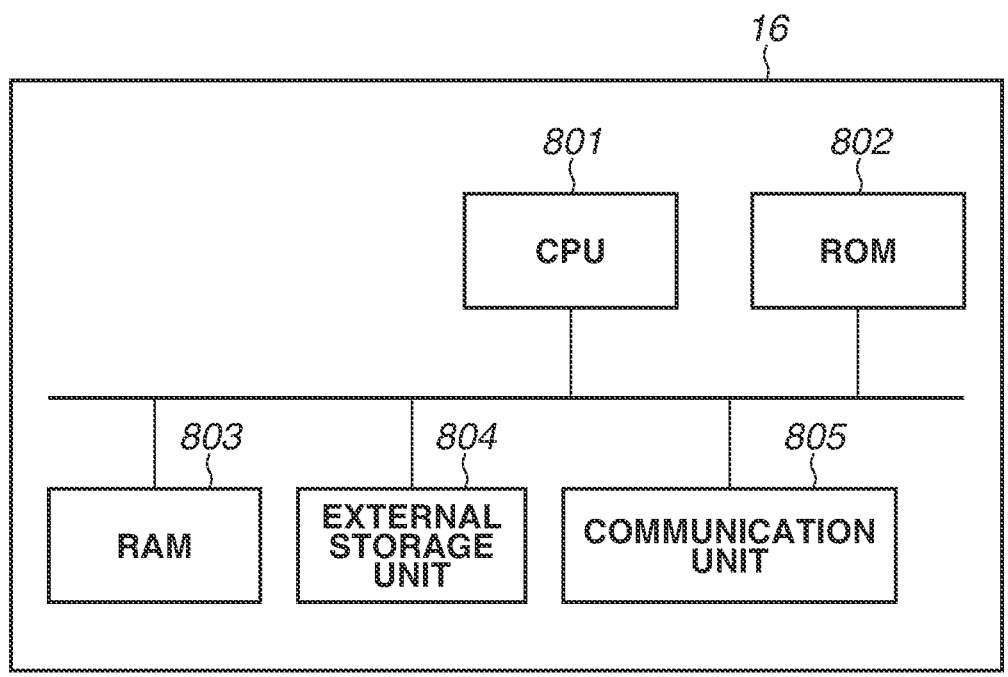
FIG. 8 is a diagram illustrating an example of a hardware configuration of a server.

FIG. 8 is a hardware block diagram of the server 16. The server 16 includes a CPU 801, a ROM 802, a RAM 803, an external storage unit 804, and a communication unit 805. The CPU 801 is a system control unit and controls the entire server 16. In the present exemplary embodiment, the server 16 is composed of a single information processing apparatus, whereas a plurality of information processing apparatuses may operate in a cooperative manner to construct a server system corresponding to the server 16. The ROM 802 stores fixed data, such as a control program to be executed by the CPU 801, a data table, and a built-in OS program. The RAM 803 retains data by using a not-illustrated primary battery for data backup, and can thus store data such as program control variables in a nonvolatile manner. The external storage unit 804 stores application software. In FIG. 7, the server 16 generates print data as described above. The external storage unit 804 of the server 16 therefore stores printing software for generating print data interpretable by the communication apparatus 14. The communication unit 805 includes a circuit and an antenna for performing communication according to a predetermined wireless communication method.

Next, processing of the voice control device 11 and the server 16 will be described with reference to FIG. 9. The flowchart in FIG. 9 corresponds to the steps of processing of the voice control device 11 and the server 16 in FIG. 7. The CPU 103 reads a program related to the processing of the flowchart from the external storage unit 107 and executes the program, whereby the processing of the voice control device 11 is performed. Meanwhile, the CPU 801 reads a program related to the processing of the flowchart from the external storage unit 804 and executes the program, whereby the processing of the server 16 is performed.

In step S901, the CPU 103 inputs words (voice) issued by the user near the voice control device 11, and generates voice data based on the input voice. In step S902, the voice data is transmitted from the voice control device 11 to the server 16.

Receiving the voice data, the CPU 801 analyzes the voice data and identifies the user's request. The server 16 receives voice data corresponding to the user request "print the picture A displayed on the display apparatus 13". In step S903, the CPU 801 then identifies the image data corresponding to the picture A displayed on the display apparatus 13, and generates print data based on the image data. In step S904, the CPU 801 selects a printer to perform print processing. Print setting information used in generating the print data in step S903 is print setting information previously set for the purpose of printing using the server 16. The CPU 801 identifies the user ID associated with the MAC address of the voice control device 11. The server 16 then identifies the communication apparatus 14 that is managed in association with the user ID. Step S904 is implemented by such processing.

In step S905, the CPU 801 transmits a notification indicating the completion of generation of the print data to the printer (communication apparatus 14) selected in step S904. In step S906, the CPU 801 determines whether a print completion notification is received from the communication apparatus 14.

In step S906, if the print completion notification is received from the communication apparatus 14 (YES in step S906), the processing proceeds to step S907. Here, the CPU 801 transmits the print completion notification to the voice control device 11 which is the source of the print instruction.

If the CPU 103 receives the print completion notification, then in step S907, the CPU 103 transmits the print completion notification to the display apparatus 13. As described above, the transmission of the print completion notification to the display apparatus 13 may be performed by the server 16. In step S908, the CPU 103 makes a notification of the completion of printing by voice. Specifically, the CPU 103 converts the print completion notification into voice, and outputs the print completion notification by voice by using the speaker 102.

Through the foregoing processing, the user can print a desired picture by a simple operation.

Figure 10:
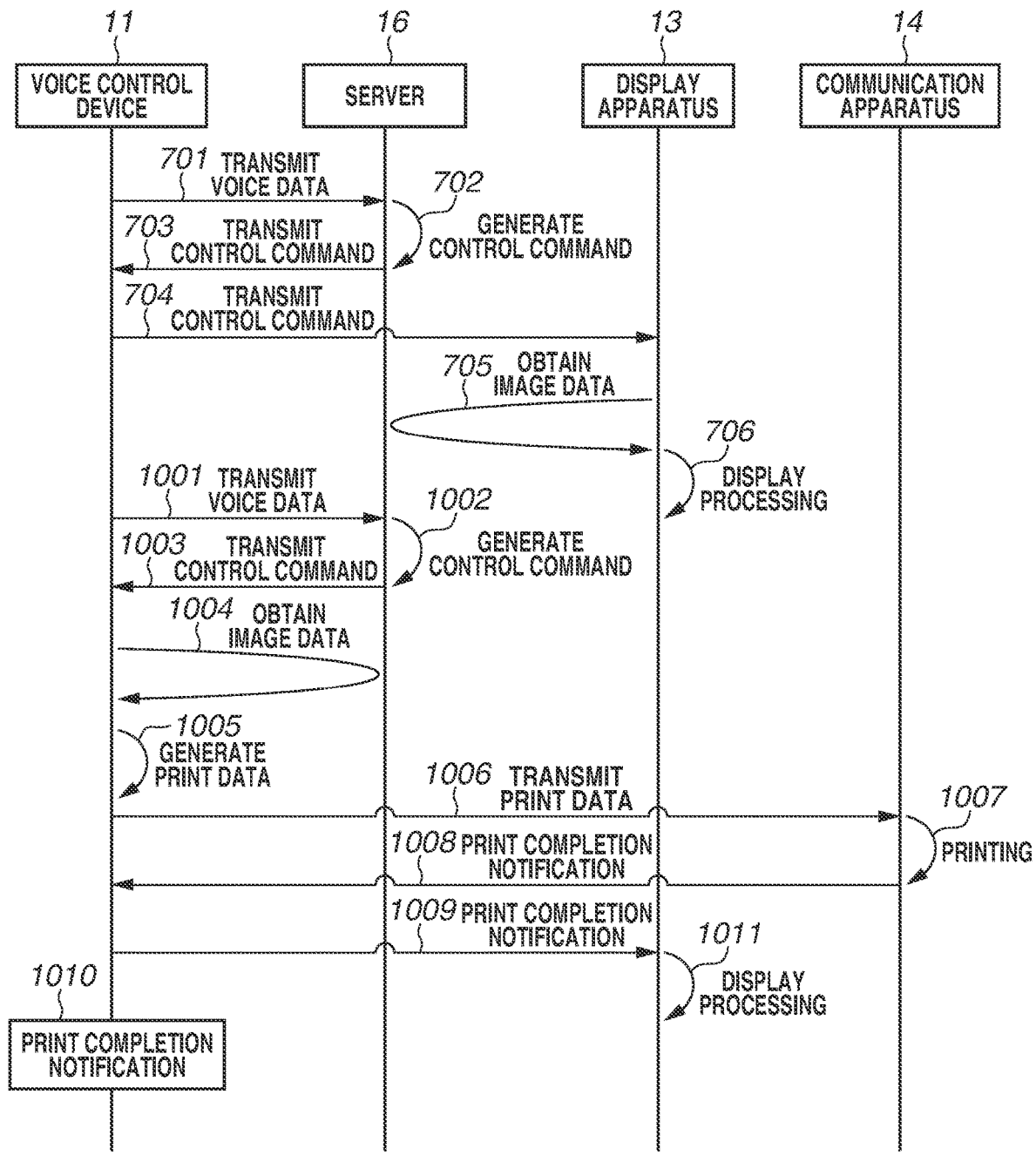
FIG. 10 is a sequence diagram related to print processing.

In FIGS. 7 and 8, the communication apparatus 14 has been described to perform printing by using the notification indicating the completion of generation of print data from the server 16. In FIG. 10, an example in which the voice control device 11 generates print data will be described.

Figure 11:
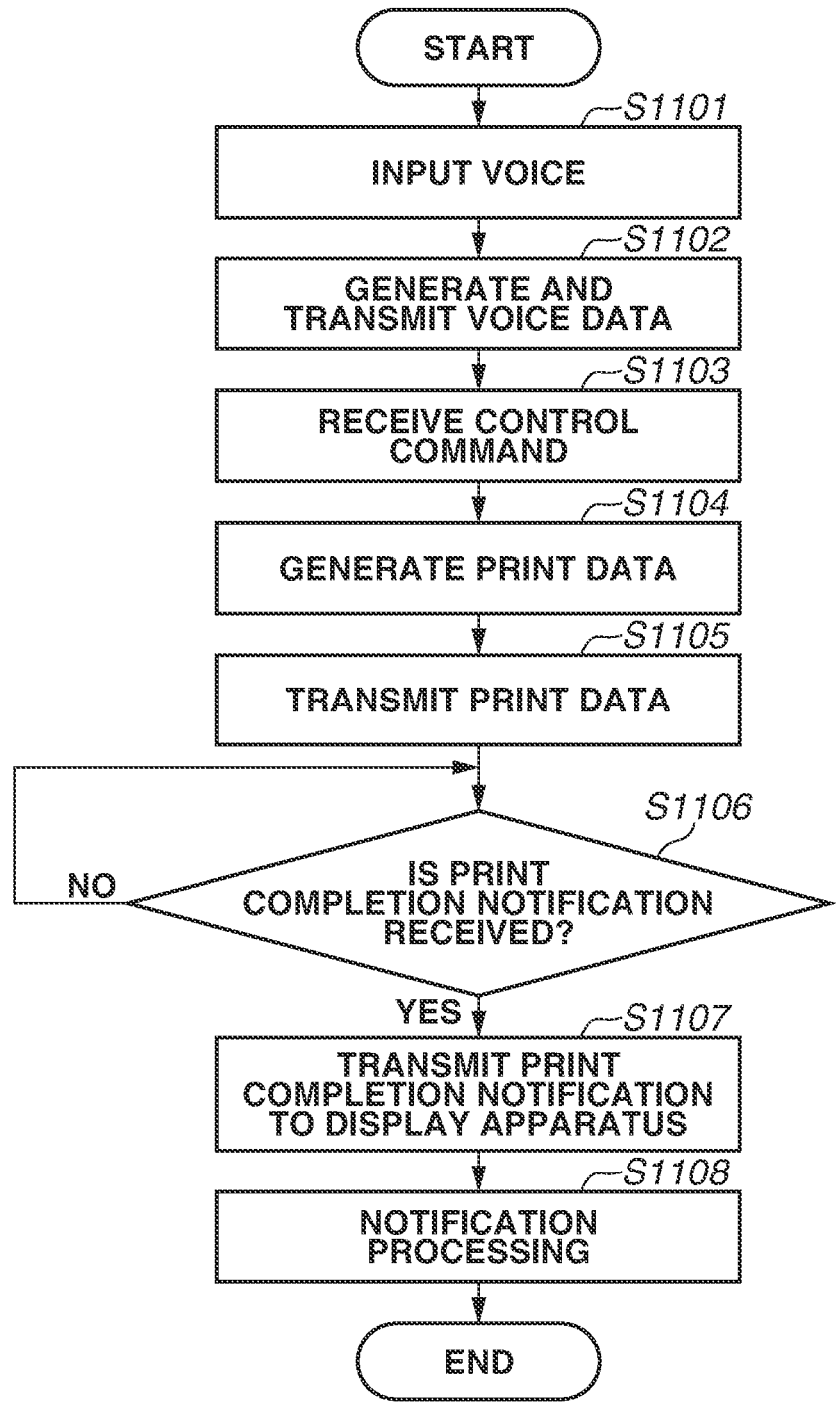
FIG. 11 is a flowchart illustrating an example of processing of the voice control device.

FIG. 10 is a sequence diagram for describing the print processing. Processing 701 to 706 is similar to that in FIG. 7. A detailed description thereof will thus be omitted. In FIGS. 10 and 11, the voice control device 11 generates print data. The external storage unit 107 of the voice control device 11 therefore stores printing software for generating print data interpretable by the communication apparatus 14, and information needed for communication. Communications between the apparatuses are performed via the AP 15.

Receiving the voice of the wake word, the voice control device 11 receives subsequently spoken words. Specifically, the voice control device 11 receives the voice "print the picture A displayed on the display apparatus 13".

In processing 1001, the voice control device 11 transmits the voice data to the server 16.

The server 16 analyzes the voice data transmitted from the voice control device 11, and performs processing based on the voice data. The server 16 here receives the voice data of the voice "print the picture A displayed on the display apparatus 13". In processing 1002, the server 16 thus generates a control command for printing the image data corresponding to the picture A.

In processing 1003, the server 16 transmits the control command generated in processing 1002 to the voice control device 11.

The voice control device 11 performs processing according to the control command. In processing 1004, the voice control device 11 obtains the image data corresponding to the picture A from the server 16 since the control command includes instructions to obtain and print the image data corresponding to the picture A.

In processing 1005, the voice control device 11 generates print data based on the obtained image data and print setting information. The print setting information used in processing 1005 is previously set in the printing software stored in the voice control device 11.

In processing 1006, the voice control device 11 transmits the print data generated in processing 1005 to the communication apparatus 14.

In processing 1007, the communication apparatus 14 completes print processing based on the print data. In processing 1008, the communication apparatus 14 transmits a print completion notification to the voice control device 11.

If the voice control device 11 receives the print completion notification, the voice control device 11 identifies the display apparatus 13 having been displaying the image to be printed according to the control command transmitted in processing 704. In processing 1009, the voice control device 11 transmits the print completion notification to the identified display apparatus 13.

If the voice control device 11 receives the print completion notification, then in processing 1010, the voice control device 11 further notifies the user of the completion of printing by voice.

If the display apparatus 13 receives the print completion notification, then in processing 1011, the display apparatus 13 displays a screen for notifying the user of the completion of printing, including a message indicating the completion of printing, on the display unit 205. In such a manner, processing for notifying the user of the completion of printing can be performed by an apparatus other than the apparatus (voice control device 11 or server 16) that has instructed the communication apparatus 14 to perform the printing.

The print completion notification that triggers the notification processing may be transmitted from the communication apparatus 14 to the display apparatus 13. In such a case, for example, the voice control device 11 transmits, to the communication apparatus 14, print data including information for identifying the display apparatus 13 that is the apparatus having been displaying the image to be printed. The communication apparatus 14 can thereby identify the transmission destination of the print completion notification. Next, processing of the voice control device 11 will be described with reference to FIG. 11. The flowchart in FIG. 11 corresponds to the steps of processing of the voice control device 11 in FIG. 10.

Figure 9:
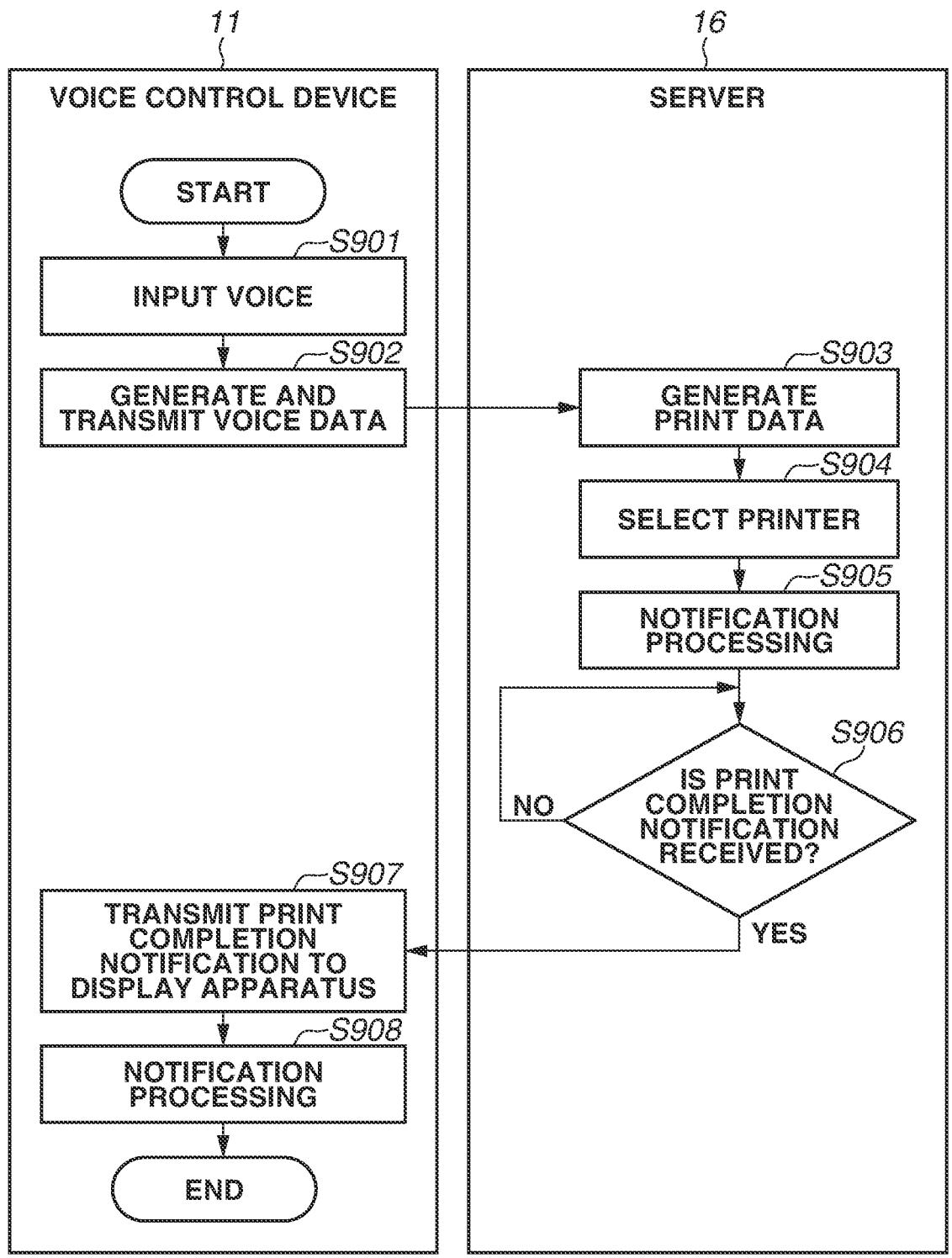
FIG. 9 is a flowchart illustrating an example of processing of the voice control device and the server.

The processing of steps S1101 and S1102 in FIG. 11 is similar to that of steps S901 and S902 in FIG. 9. A detailed description thereof will thus be omitted.

In step S1103, the CPU 103 receives the control command from the server 16. The CPU 103 analyzes the received control command and identifies next processing to be performed. The control command includes an instruction to obtain the image data on the picture A and a print instruction for the image data. In step S1104, the CPU 103 therefore obtains the image data from the server 16 and generates print data. In step S1104, the CPU 103 generates the print data by using the print setting information which is set in advance as describe above.

In step S1105, the CPU 103 transmits the print data to the communication apparatus 14. The CPU 103 has registered the display apparatus 13 and the communication apparatus 14 as the apparatuses to be controlled by the voice control device 11, according to instructions given via the screen 507 in FIG. 5 described above. According to such registration, the CPU 103 determines the communication apparatus 14 as the transmission destination of the print data.

In step S1106, the CPU 103 determines whether a print completion notification is received. If a print completion notification is received (YES in step S1106), the processing proceeds to step S1107. In step S1107, the CPU 103 transmits the print completion notification to the display apparatus 13. As described above, the transmission of the print completion notification to the display apparatus 13 may be performed by the communication apparatus 14. In step S1108, the CPU 103 makes a notification of the completion of printing by voice.

Through the foregoing processing, the user can print a desired picture by a simple operation. In addition, the load of the server 16 can be reduced.

Next, an example in which the display apparatus 13 generates print data will be described.

Figure 12:
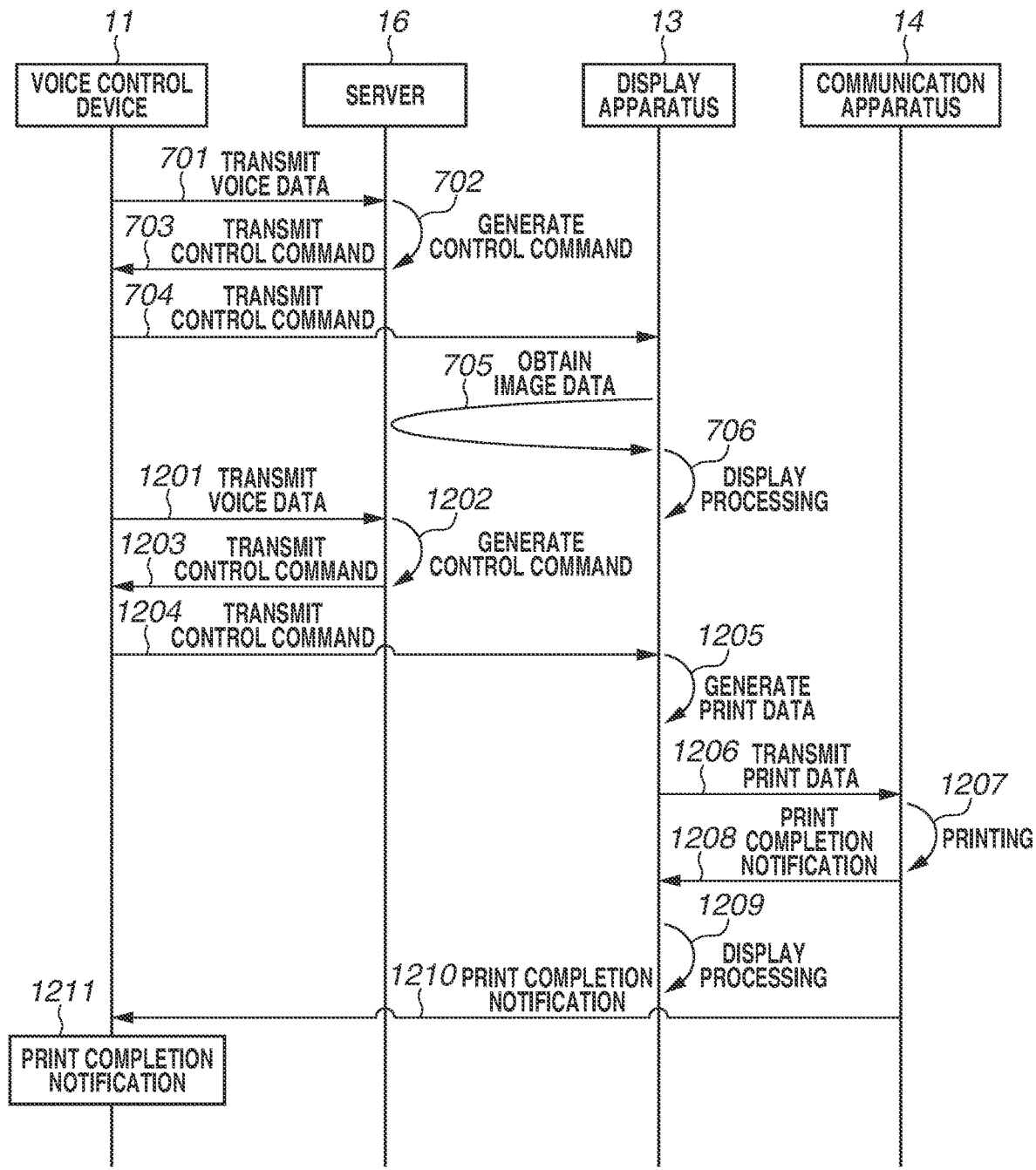
FIG. 12 is a sequence diagram related to print processing.

FIG. 12 is a sequence diagram for describing the print processing. Processing 701 to 706 is similar to that in FIG. 7. A detailed description thereof will thus be omitted. Processing 1201 to 1203 is similar to processing 1001 to 1003 in FIG. 10. Processing 1207, 1208, and 1209 is similar to processing 1007, 1008, and 1011 in FIG. 10, respectively. A detailed description thereof will thus be omitted. In the processing in FIG. 12, the display apparatus 13 generates print data. The external storage unit 207 of the display apparatus 13 therefore stores printing software for generating print data interpretable by the communication apparatus 14, and information needed for communication.

The voice control device 11 performs processing according to the control command transmitted in processing 1203. The control command includes instructions to obtain and print the image data corresponding to the picture A. In FIG. 12, the display apparatus 13 generates print data. In processing 1204, the voice control device 11 therefore transmits the control command to the display apparatus 13.

The display apparatus 13 performs processing according to the received control command. In processing 1205, since the display apparatus 13 has already obtained the image data for display, the display apparatus 13 generates print data based on the already obtained image data. Print setting information used in processing 1205 is previously set in the printing software stored in the display apparatus 13. The display apparatus 13 here may display the print setting information on the display unit 205.

In processing 1206, the display apparatus 13 transmits the print data generated in processing 1205 to the communication apparatus 14.

In processing 1207, the communication apparatus 14 performs print processing based on the received print data.

In processing 1208 and 1210, the communication apparatus 14 transmits a print completion notification to the display apparatus 13 and the voice control device 11. The display apparatus 13 transmits information relating to itself and information relating to the transmission source of the control command to the communication apparatus 14 as information relating to the transmission destination of the print completion notification. The communication apparatus 14 identifies the transmission destination of the print completion notification by receiving the information relating to the transmission destination of the print completion notification from the display apparatus 13 along with the print data.

If the display apparatus 13 receives the print completion notification, then in processing 1209, the display apparatus 13 displays a screen for notifying the user of the completion of printing, including a message indicating the completion of printing, on the display unit 205.

If the voice control device 11 receives the print completion notification, then in processing 1211, the voice control device 11 notifies the user of the completion of printing by voice.

Such a configuration is not restrictive. For example, the communication apparatus 14 may be configured to transmit the print completion notification to only one apparatus, either the display apparatus 13 or the voice control device 11. Either one of the display apparatus 13 and the voice control device 11 that receives the print completion notification may transmit the print completion notification to the other of the display apparatus 13 or the voice control device 11 which has not received the print completion notification. In such a case, for example, the voice control device 11 identifies the transmission destination of the print completion notification by identifying the display apparatus 13 from among the apparatuses to be controlled. For example, the voice control device 11 identifies the transmission source of the control command as the transmission destination of the print completion notification.

Through the foregoing processing, the user can print a desired picture by a simple operation. In addition, the load of the server 16 and the voice control device 11 can be reduced.

Next, setup processing for the communication apparatus 14 to perform print processing according to a voice-based print instruction input to the voice control device 11 will be described.

Various types of voice control devices will initially be described by using examples.

Suppose, for example, that printing is performed by using a voice control device 11 manufactured by A Company. In such a case, a server A corresponding to the voice control device 11 generates print data. The communication apparatus 14 can display a screen for setting a user ID and a password for accessing the server A.

In the case of performing printing by using a voice control device 11 manufactured by B Company, a server B corresponding to the voice control device 11 generates print data. The communication apparatus 14 prints an invitation page for accessing the server B.

In the case of performing printing by using a voice control device 11 manufactured by C Company, a server C corresponding to the voice control device 11 generates print data. The mobile terminal 12 accepts operations for the communication apparatus 14 to access the server C.

In the case of performing printing by using a voice control device 11 manufactured by D Company, the voice control device 11 generates print data. In other words, no server cooperation is needed.

In the case of performing printing by using a voice control device 11 manufactured by E Company, a server E corresponding to the voice control device 11 generates print data. The communication apparatus 14 can display a screen for setting a user ID and a password for accessing the server E. FIG. 15 illustrates a table summarizing the foregoing features. The table in FIG. 15 is stored in the communication apparatus 14. The wake words of the voice control devices 11 vary from one manufacturer to another.

Figure 13:
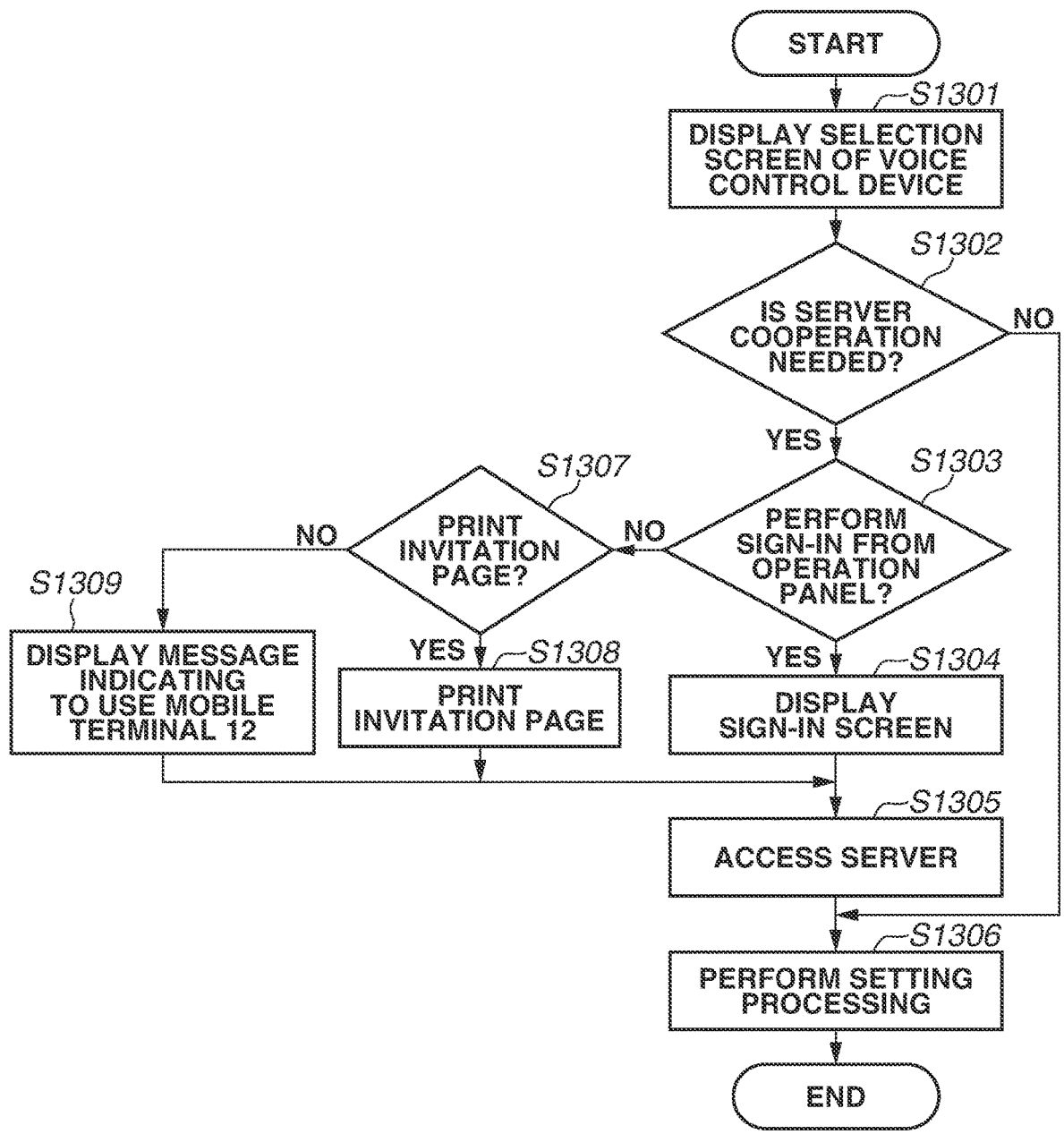
FIG. 13 is a flowchart illustrating an example of processing of the communication apparatus.

Next, processing of the communication apparatus 14 will be described with reference to FIG. 13.

Figure 14:
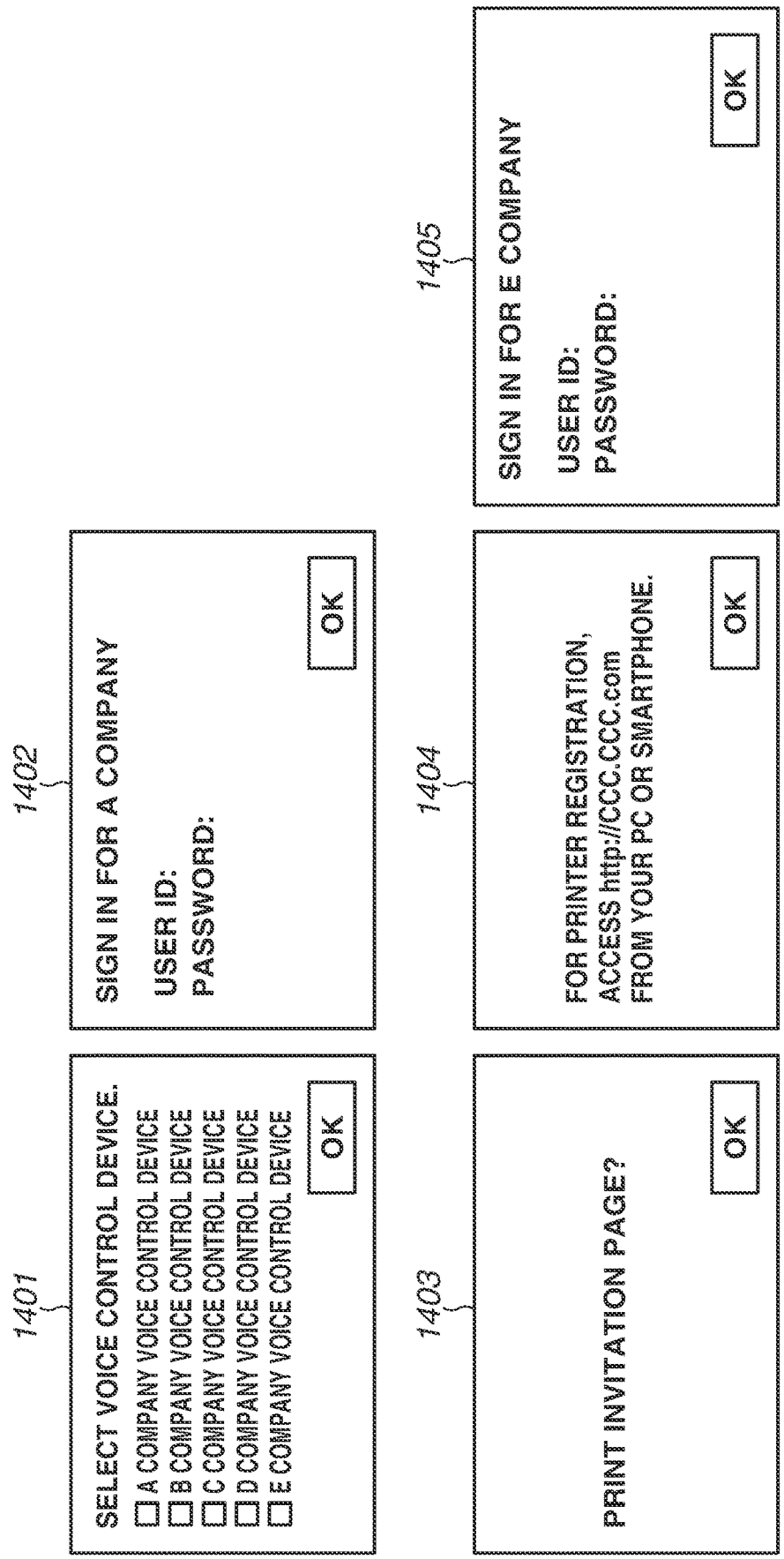
FIG. 14 is a diagram illustrating examples of screens displayed by the communication apparatus.

Initially, the user gives instructions for cooperation of a voice control device 11 and the communication apparatus 14. In step S1301, the CPU 407 display a selection screen 1401 of a voice control device 11 to cooperate. FIG. 14 illustrates examples of screens related to a setup of the communication apparatus 14.

In step S1302, the CPU 407 determines whether server cooperation is needed, based on the voice control device 11 selected on the selection screen 1401. For example, the communication apparatus 14 makes the determination of step S1302 by using the table in FIG. 15. More specifically, if the voice control device 11 of A, B, C, or E Company is selected, the determination of the CPU 407 in step S1302 is yes. If the voice control device 11 of D Company is selected, the determination of the CPU 407 is no.

If the determination in step S1302 is no (NO in step S1302), the processing proceeds to step S1306 to be described below.

If the determination in step S1302 is yes (YES in step S1302), the processing proceeds to step S1303. In step S1303, the CPU 407 determines whether to perform sign-in from the operation panel of the communication apparatus 14. If the voice control device 11 of A or E Company is selected, the determination of the CPU 407 in step S1303 is yes. If the voice control device 11 of B or C Company is selected, the determination of the CPU 407 in step S1303 is no.

If the determination in step S1303 is yes (YES in step S1303), the processing proceeds to step S1304. In step S1304, the CPU 407 displays a sign-in screen on the operation panel. In step S1305, the CPU 407 accesses the server by using a user ID and a password input from the sign-in screen. If the voice control device 11 of A Company is selected, a sign-in screen 1402 is displayed in step S1304. If the voice control device 11 of E Company is selected, a sign-in screen 1405 is displayed in step S1304.

If the determination in step S1303 is no (NO in step S1303), the processing proceeds to step S1307. In step S1307, the CPU 407 determines whether to print an invitation page. If the voice control device 11 of B Company is selected, the determination of the CPU 407 in step S1307 is yes. If the voice control device 11 of C Company is selected, the determination of the CPU 407 in step S1307 is no.

If the determination in step S1307 is yes (YES in step S1307), the processing proceeds to step S1308. In step S1308, the CPU 407 displays a screen 1403 which indicates printing of an invitation page. If the user presses an OK button on the screen 1403, the CPU 407 prints the invitation page. Specifically, the CPU 407 transmits a print request for the invitation page and the MAC address of the communication apparatus 14 to the server B, and receives print data on the invitation page from the server B. The CPU 407 then performs print processing based on the received print data. The printed invitation page includes a dedicated URL related to the registration processing of the communication apparatus 14. The user then inputs the URL of the invitation page into the mobile terminal 12, whereby a sign-in screen for the communication apparatus 14 is displayed on the mobile terminal 12. The user inputs a user ID and a password into the sign-in screen for the communication apparatus 14, displayed on the mobile terminal 12, and transmits the user ID and the password to the server B. The server B performs sign-in processing based on the user ID and password received from the sign-in screen for the communication apparatus 14. If the sign-in processing is successful, the server B manages the user ID received from the sign-in screen for the communication apparatus 14 and the MAC address of the communication apparatus 14 in association with each other. The server B then notifies the communication apparatus 14 of the successful sign-in, and transmits the user ID and the password to the communication apparatus 14. After the processing of step S1308, the processing proceeds to step S1305. In step S1305, the CPU 407 accesses the server B.

If the determination in step S1307 is no (NO in step S1307), the processing proceeds to step S1309. In step S1309, the CPU 407 displays a message 1404 indicating to use the mobile terminal 12 for association. In other words, the processing of step S1309 is performed if the voice control device 11 of C Company is selected. The processing of step S1309 corresponds to the above-mentioned different processing for the communication apparatus 14 to sign in on the server 16. A detailed description thereof will thus be omitted. After the processing of step S1309, the processing proceeds to step S1305. In step S1305, the CPU 407 accesses the server C.

In step S1306, i.e., after step S1305, the CPU 407 performs setting processing for cooperating with the voice control device 11. For example, the communication apparatus 14 operates in a power saving state if no print data is received for a predetermined period. There are a first power saving mode and a second power saving mode. In the first power saving mode, the communication apparatus 14 perform print processing based on print data if the communication apparatus 14 receives the print data while operating in the power saving state. In the second power saving mode, the communication apparatus 14 does not perform print processing even if print data is received. The second power saving mode has power consumption lower than that of the first power saving mode. The CPU 407 here sets the first power saving mode as the setting processing for cooperating with the voice control device 11. In the first power saving mode, the print processing may be performed only if print data based on a voice-based print instruction accepted by the voice control device 11 is received.

While the processing of step S1301 is described by using an example in which the user selects the voice control device 11, other methods may be used. For example, the communication apparatus 14 obtains device information from voice control devices 11 that are found by performing a device search. The CPU 407 may then automatically select a voice control device 11 to cooperate with based on the device information obtained from the voice control devices 11. In such a case, the processing of step S1301 is omitted.

By the foregoing processing, the communication apparatus 14 can appropriately perform print processing even if print data is transmitted via various routes. If there is a plurality of same voice control devices 11 on the network in performing the processing in FIG. 13, the communication apparatus 14 signs in on the same server to cooperate with each of the voice control devices 11. For example, if there is a plurality of voice control devices 11 manufactured by A Company on the network, the user has only to sign in once to cooperate with the server A by using the communication apparatus 14. On the other hand, if there is a plurality of different voice control devices 11 on the network, the communication apparatus 14 signs in on different servers to cooperate with the respective voice control devices 11. For example, if there are a voice control device 11 of A Company and a voice control device 11 of E Company on the network, the user signs in to cooperate with the server A and signs in to cooperate with the server E by using the communication apparatus 14.

Figure 16:
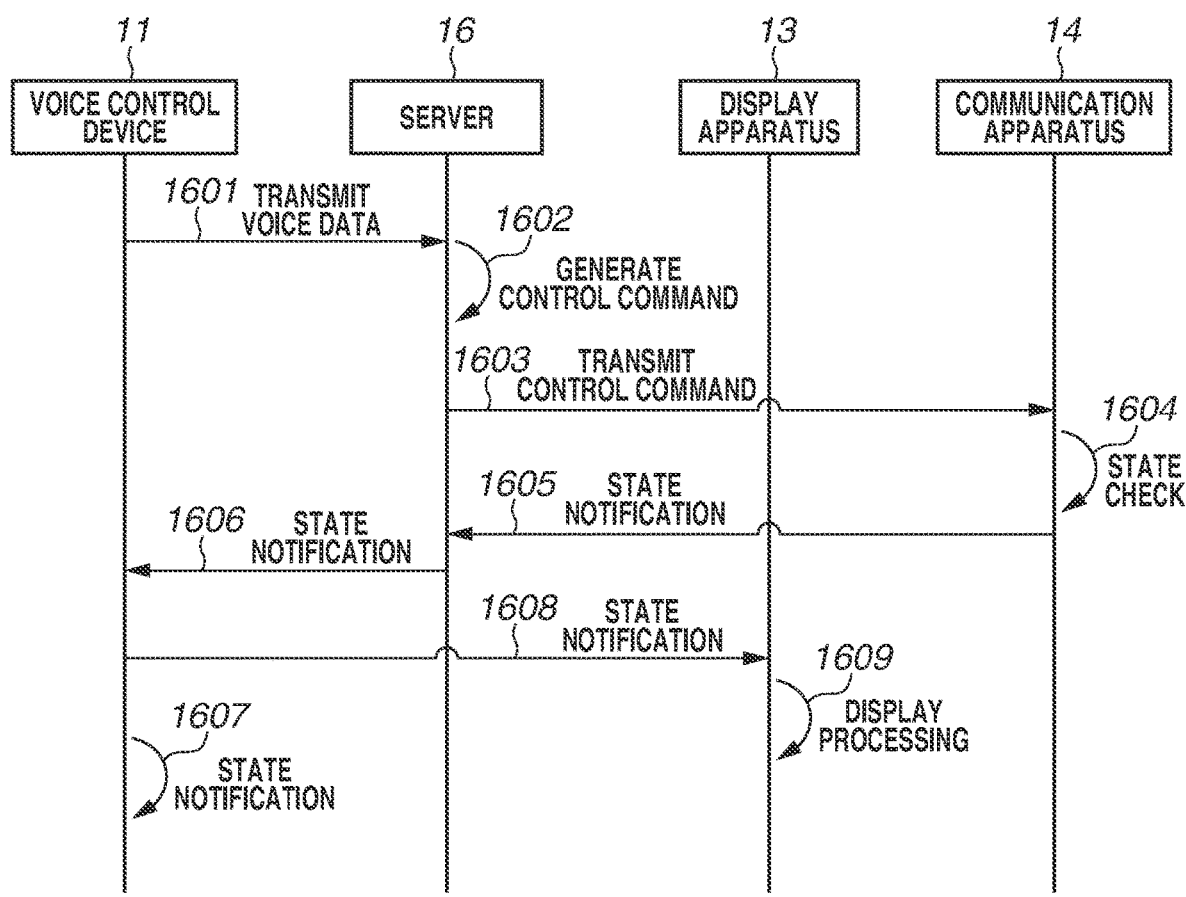
FIG. 16 is a sequence diagram related to processing different from printing.

Next, processing in a case where the user requests processing other than printing by voice will be described with reference to FIG. 16. Communications between the apparatuses are performed via the AP 15. For example, the user says "tell me the remaining ink levels" after the wake word.

Receiving the voice of the wake word, the voice control device 11 receives the subsequently spoken voice. Specifically, the voice control device 11 receives the voice "tell me the remaining ink levels".

In processing 1601, the voice control device 11 transmits the identification information (for example, MAC address) relating to the voice control device 11 and voice data based on the received voice, to the server 16.

In processing 1602 and 1603, the server 16 analyzes the voice data transmitted from the voice control device 11, generates a control command based on the voice data, and transmits the control command to the communication apparatus 14. The control command includes a check instruction for the remaining ink levels.

The communication apparatus 14 performs processing according to the control command. In processing 1604 and 1605, the communication apparatus 14 checks the remaining ink levels, and transmits the check result (state of the remaining ink levels) to the server 16. Specifically, the communication apparatus 14 transmits the state of the remaining ink levels to the server 16 as a state notification. The server 16 generates voice data based on the check result. For example, if the server 16 receives a check result indicating that cyan ink is running short, the server 16 generates voice data indicating that cyan ink is running short.

In processing 1606, the server 16 transmits the state notification to the voice control device 11. In processing 1607, the voice control device 11 makes a notification of the state of the communication apparatus 14, or the check result, by voice based on the received voice data. Aside from the remaining ink levels, the voice control device 11 may accept inquiries about a status of the communication apparatus 14, the remaining amount of sheets, a network connection status, and whether print processing or scan processing is in process.

In processing 1608, the voice control device 11 transmits the state notification to the display apparatus 13. The voice control device 11 here identifies an apparatus having a display service among the apparatuses linked with the same user ID as the voice control device 11 is, as the transmission destination of the state notification. Alternatively, the voice control device 11 identifies an apparatus having a display service among the apparatuses to be controlled, as the transmission destination of the state notification.

The state notification that triggers the display processing may be transmitted from the server 16 to the display apparatus 13. In such a case, the server 16, receiving the state notification from the communication apparatus 14, may identify an apparatus having a display service among the apparatuses linked with the same user ID as the voice control device 11 is, as the transmission destination apparatus of the state notification. The server 16 transmits the state notification to the apparatus thus identified.

If the display apparatus 13 receive the state notification, then in processing 1609, the display apparatus 13 displays a screen for notifying the user of the state of the communication apparatus 14 or the check result, including a message for notifying the user of the state of the communication apparatus 14, on the display unit 205 based on the received state notification.

If the user is notified by voice that cyan ink is running short, the user may further order cyan ink by voice. In such a case, the voice control device 11 receives a serial number identifying the product type of the communication apparatus 14. The voice control device 11 then transmits voice data indicating the order for the cyan ink and the serial number, to the server 16. The server 16 may then generate order data and place an order based on the voice data and the serial number.

If an error occurs and the user's operations are needed, the communication apparatus 14 displays the operation method on the operation panel of the communication apparatus 14. If the user's operations involve a two-handed operation, the communication apparatus 14 generates and transmits voice data on the operation method to the voice control device 11. The voice control device 11 makes a notification of the operation method by voice. This can facilitate the user to perform even the two-handed operation. For example, the communication apparatus 14 may display instructions for ink replacement on the operation panel, and may make a notification by voice in the event of paper jam during printing or for an ink wiping operation for cleaning.

By the foregoing processing, the user can easily request processing other than printing.

Figure 17:
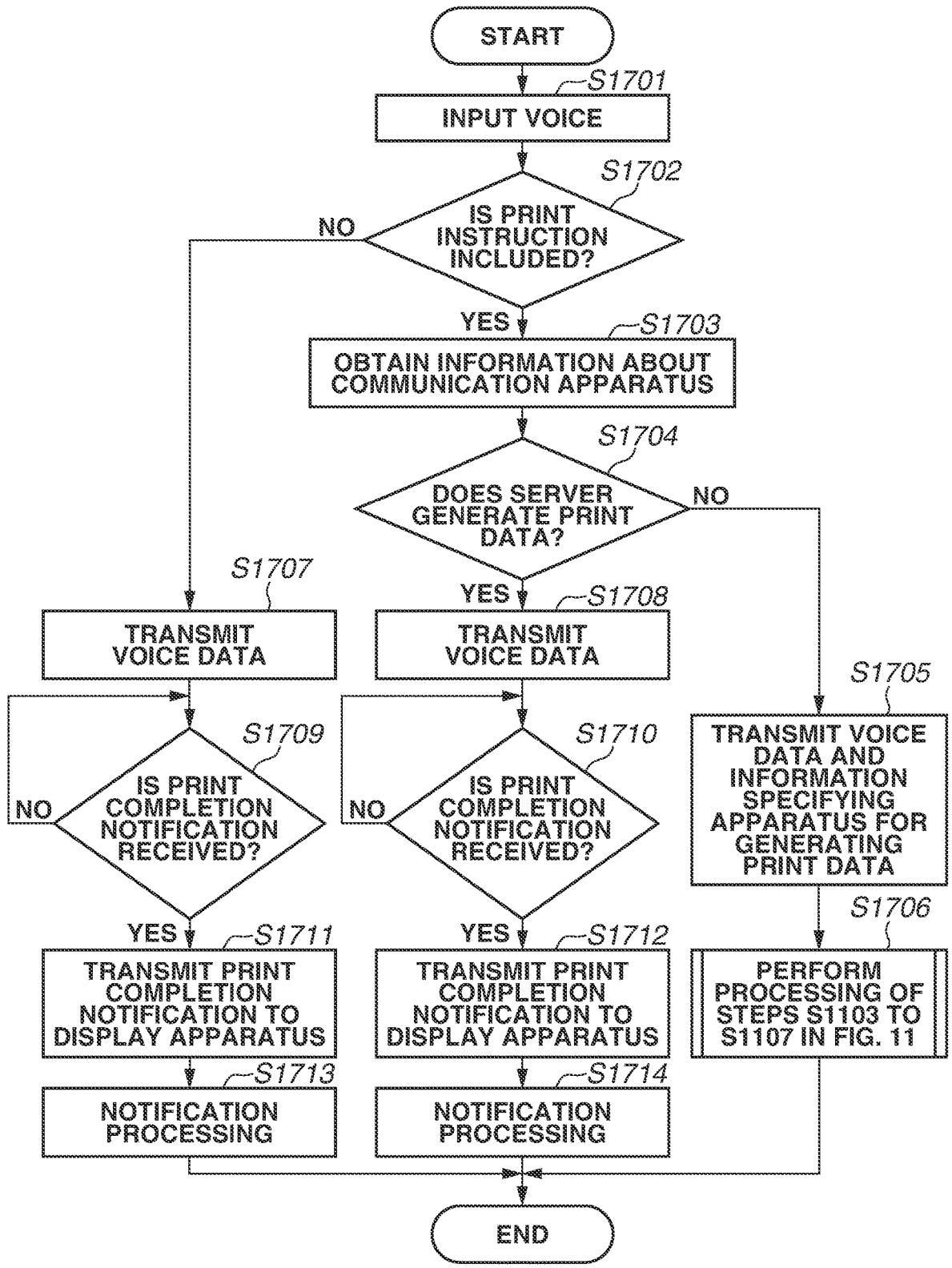
FIG. 17 is a flowchart illustrating an example of processing of the voice control device.

Next, processing in which the voice control device 11 switches whether to generate print data by itself or request the server 16 to generate the print data will be described. FIG. 17 is a flowchart for describing the processing of the voice control device 11.

In step S1701, the CPU 103 inputs words (voice) issued by the user near the voice control device 11 after the wake word.

In step S1702, the CPU 103 determines whether the voice includes a print instruction. If the determination in step S1702 is no (NO in step S1702), the processing proceeds to step S1707. In step S1707, the CPU 103 generates voice data based on the input voice, and transmits the voice data to the server 16.

On the other hand, if the determination in step S1702 is yes (YES in step S1702), the processing proceeds to step S1703. In step S1703, the CPU 103 obtains information relating to the communication apparatus 14. For example, if the communication apparatus 14 has performed sign-in processing on the server 16, the communication apparatus 14 retains information indicating to have server cooperation. In step S1703, the CPU 103 then obtains the information indicating to have server cooperation or information indicating the completion of the sign-in processing on the server 16.

In step S1704, the CPU 103 determines whether the server 16 generates print data, based on the information obtained in step S1703. Specifically, if the information indicating to have server cooperation or the information indicating the completion of the sign-in processing on the server 16 is obtained in step S1703, the CPU 103 determines that the server 16 generates print data (YES in step S1704). On the other hand, if such information is not obtained in step S1703, the CPU 103 determines that the server 16 does not generate print data (NO in step S1704).

If the determination in step S1704 is no (NO in step S1704), the processing proceeds to step S1705. In step S1705, the CPU 103 generates voice data based on the input voice. The CPU 103 further generates information specifying the "voice control device 11" as an apparatus for a g print data. The CPU 103 then transmits the voice data and the information specifying the apparatus for generating print data, to the server 16.

In step S1706, the CPU 103 performs the processing of steps S1103 to S1107 in FIG. 11. As a result, processing 1003 and the subsequent processing in FIG. 10 are performed.

On the other hand, if the determination in step S1704 is yes (YES in step S1704), the processing proceeds to step S1708. In step S1708, the CPU 103 generates voice data based on the input voice, and transmits the voice data to the server 16. After step S1708, processing 708 and the subsequent processing in FIG. 7 are performed. In step S1708, information specifying the "server 16" as the apparatus for generating print data may be transmitted along with the voice data.

In steps S1709 and S1710, the CPU 103 determines whether a print completion notification is received. The CPU 103 repeats the processing until a print completion notification is received.

In steps S1711 and S1712, the CPU 103 transmits the print completion notification to the display apparatus 13. As described above, the transmission of the print completion notification to the display apparatus 13 may be performed by the server 16 or the communication apparatus 14.

In steps S1713 and S1714, the CPU 103 notifies the user of the completion of printing by voice.

By the foregoing processing, if the communication apparatus 14 can obtain print data from the server 16, the voice control device 11 makes the server 16 generate the print data. On the other hand, if the communication apparatus 14 cannot obtain print data from the server 16, the voice control device 11 generates the print data. By such processing, the voice control device 11 can perform efficient processing. Specifically, if the communication apparatus 14 can obtain print data from the server 16, the voice control device 11 can request the server 16 to generate the print data. This reduces the generation load of the print data. In FIG. 17, the processing of step S1702 and the subsequent steps is performed if the user inputs a voice in step S1701. However, the processing may be performed at different timing. For example, before step S1701, the voice control device 11 may perform steps S1703 and S1704 to determine the apparatus for generating print data in advance.

Other information may be obtained in step S1703. For example, the communication apparatus 14 can identify whether the server 16 has been signed in. The communication apparatus 14 may thus specify either the "voice control device 11" or the "server 16" as the apparatus for generating print data. Moreover, information indicating whether server cooperation is enabled may be obtained in step S1703. If server cooperation is enabled, the determination in step S1704 may be yes. If server cooperation is disabled, the determination in step S1704 may be no.

A second exemplary embodiment deals with a case where the communication apparatus 14 has the functions of the voice control device 11. A description of functions similar to those of the first exemplary embodiment will be omitted.

FIG. 18 is a system configuration diagram according to the present exemplary embodiment. A difference from FIG. 1 lies in that there is no voice control device 11. Another difference is that a communication apparatus 18 has the functions of the voice control device 11 in addition to those of the communication apparatus 14.

FIG. 19 is a sequence diagram for describing a processing flow up to printing according to the present exemplary embodiment. FIG. 19 is a sequence diagram for describing processing in which the communication apparatus 18 performs print processing according to a print instruction issued by voice by the user. Suppose that the display apparatus 13 has already signed in on the server 16. Instructions the user issues by voice are similar to those described in FIG. 7. Specifically, before processing 701, the user speaks the wake word and then says "display the picture A". Before processing 707, the user speaks the wake word and then says "print the picture A displayed on the display apparatus 13". Processing 701 to 708 is similar to that in FIG. 7 except that the voice control device 11 is replaced with the communication apparatus 18. Communications between the apparatuses are performed via the AP 15.

If the generation of print data is completed, then in processing 1901, the server 16 transmits a notification indicating the completion of generation of the print data to the communication apparatus 18.

If the communication apparatus 18 receives the notification indicating the completion of generation of the print data, then in processing 1902, the communication apparatus 18 accesses the server 16 and obtains the print data. In processing 1903, the communication apparatus 18 performs printing.

If the print processing is completed, then in processing 1904, the communication apparatus 18 transmits a print completion notification to the server 16. The server 16 then changes a status of the print data generated in processing 708 from "being printed" to "completed".

If the print processing is completed, the communication apparatus 18 identifies the display apparatus 13 having been displaying the image to be printed according to the control command transmitted in processing 704. In processing 1905, the communication apparatus 18 transmits the print completion notification to the identified display apparatus 13.

If the display apparatus 13 receives the print completion notification, then in processing 1906, the display apparatus 13 displays a screen for notifying the user of the completion of printing, including a message indicating the completion of printing, on the display unit 205. In processing 1907, the communication apparatus 18 makes a notification of the completion of printing by voice.

According to the present exemplary embodiment, the communication apparatus 18 has the functions of the voice control device 11. Highly convenient print processing can thus be implemented by a system configuration simpler than that of the first exemplary embodiment.

Other Exemplary Embodiments

In the foregoing exemplary embodiments, the print data based on the picture displayed on the display apparatus 13 has been described to be printed. However, printing instructions may be given in other forms.

For example, the user says "print the file A" after the wake word. The voice control device 11 or the communication apparatus 18 transmits voice data corresponding to the voice "print the file A" to the server 16. The server 16 may then search data managed for the user for data named file A, and generate print data.

The content of a notification may be displayed on the display apparatus 13 even in the configuration in which print data based on data other than the picture displayed on the display apparatus 13 is printed as described above.

In the foregoing exemplary embodiments, image data corresponding to a picture has been described to be printed. However, the data to be printed is not limited to image data and may be document data.

In the foregoing exemplary embodiments, the communication apparatus 14 (or communication apparatus 18) has been described to perform printing according to a print instruction given by voice issued by the user. However, the communication apparatus 14 (or communication apparatus 18) may perform print processing based on print data that is generated by non-voice instructions for printing software (for example, printer driver) installed on a PC. Non-voice instructions refer to instructions given by operations using a mouse or operations using a touch panel.

In the foregoing exemplary embodiments, Bluetooth has been described as an example of short-range wireless communications. However, other communication methods may be used. For example, Wi-Fi Aware may be used instead of Bluetooth.

In the foregoing exemplary embodiments, the communication apparatus 14 has been described to transmit the print completion notification and the state notification. However, such a configuration is not restrictive. That is, notifications that the communication apparatus 14 transmits to the voice control deice 11 may have any content as long as the content is to be notified to the user. Specifically, for example, the communication apparatus 14 may transmit an error notification to the voice control device 11 in a case such as when an error occurs during printing or when a print setting included in print data is not supported by the setting, hardware, or software of the communication apparatus 14. The error notification and other notifications may be transmitted to the display apparatus 13 in a manner similar to that of the transmission of the print completion notification and the state notification to the display apparatus 13.

In the foregoing description, the notifications transmitted from the communication apparatus 14 are controlled to be delivered to the display apparatus 13. However, such a configuration is not restrictive. For example, information for displaying a remote operation screen for remotely operating the communication apparatus 14 may be controlled to be delivered to the display apparatus 13. Suppose, for example, that the user issues a voice including a predetermined word for displaying the remote operation screen. The voice control device 11 then receives the voice. In such a case, a transmission instruction for the information for displaying the remote operation screen is transmitted to the communication apparatus 14 via a route similar to that by which print data is transmitted to the communication apparatus 14 in the foregoing exemplary embodiments. Accepting the transmission instruction, the communication apparatus 14 transmits the information for displaying the remote operation screen to the display apparatus 13 via a route similar to that by which the notifications are transmitted to the display apparatus 13 in the foregoing exemplary embodiments. The display apparatus 13 can thus display the remote operation screen. The display apparatus 13 can thereby present the remote operation screen to the user. Now, suppose that the user issues a voice including a predetermined word for switching or updating the content of the remote operation screen while the remote operation screen is displayed on the display apparatus 13. In such a case, a transmission instruction for information for displaying the switched or updated remote operation screen is transmitted to the communication apparatus 14 via the route similar to that by which print data is transmitted to the communication apparatus 14 in the foregoing exemplary embodiments. The information for displaying the switched or updated remote operation screen is then transmitted to the display apparatus 13 via the route similar to that by which the notifications are transmitted to the display apparatus 13 in the foregoing exemplary embodiments. In such a manner, the content of the remote operation screen displayed on the display apparatus 13 can be switched or updated. A transmission instruction for information for displaying an updated remote operation screen may be automatically transmitted each time a predetermined condition is satisfied, regardless of whether the user issues a voice including the predetermined word. The remote operation screen may display a status of the communication apparatus 14 and/or a status of the print processing that is being performed by the communication apparatus 14. Examples of the status of the communication apparatus 14 include the remaining ink levels and the remaining amount of sheets of the communication apparatus 14, and a network connection status of the communication apparatus 14. Examples of the status of the print processing that is being performed by the communication apparatus 14 include statuses indicating whether the print processing is in process, whether an error occurs in the print processing, and whether the print processing is completed.

In the foregoing description, the notifications are made to both the voice control device 11 and the display apparatus 13. However, such a configuration is not restrictive. For example, the notifications may be made to either one alone. In the foregoing description, the voice control device 11 includes no display unit. However, such a configuration is not restrictive. The voice control device 11 may not include a display unit of high performance or a display unit having a large area for presenting the content of the notifications transmitted from the communication apparatus 14 but may include a display unit of low display performance or a display unit having a small area for presenting brief information to the user. If the voice control device 11 includes a display unit of high performance or a display unit having a large area, the voice control device 11 may display screens relating to the notifications transmitted from the communication apparatus 14 on its own display unit.

In the foregoing description, the screens relating to the notifications transmitted from the communication apparatus 14 are displayed on the display apparatus 13. However, such a configuration is not restrictive. For example, the screens may be displayed on the mobile terminal 12.

The foregoing exemplary embodiments may be implemented by performing the following processing. The processing includes supplying software (programs) for implementing the functions of the foregoing exemplary embodiments to a system or an apparatus via a network or various storage media. The processing further includes reading and executing the programs by a computer (such as a CPU, a microprocessing unit (MPU), or a processor) of the system or the apparatus. The programs may be executed by a single computer or by a plurality of computers in a cooperative manner. All the foregoing processing does not need to be implemented by software, and part or all of the processing may be implemented by hardware like an application specific integrated circuit (ASIC). All the processing does not necessarily need to be performed by a single CPU, and may be performed by a plurality of CPUs in an appropriate cooperative manner.

According to an exemplary embodiment, the content of a notification transmitted from a communication apparatus can easily be visually presented to the user in a configuration in which processing instructions are given to the communication apparatus based on user instructions issued to a voice control device by voice.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-167753, filed Aug. 31, 2017, which is hereby incorporated by reference herein in its entirety.

What is claimed is:

1. A notification system including a mobile terminal external to a printing apparatus that performs print processing, a server system comprising one or more servers and external to the printing apparatus and external to the mobile terminal, and a voice control device external to the printing apparatus, external to the mobile terminal and external to the server system, the server system comprising:
one or more processors; and
one or more memories storing one or more programs configured to be executed by the one or more processors, the one or more programs including instructions for:
performing link processing for linking the printing apparatus and a predetermined user ID;
causing the mobile terminal to display an input screen for inputting the predetermined user ID, wherein sign-in for using a print service is performed based on the predetermined user ID inputted on the input screen;
performing, based on receiving a voice indicating a predetermined instruction by the voice control device after the link processing and the sign-in are performed, both of (i) screen notification control causing the mobile terminal that has displayed the input screen to display a screen regarding the printing apparatus, and (ii) voice notification control causing the voice control device that has received the voice indicating the predetermined instruction to output audio regarding the printing apparatus,
wherein the mobile terminal comprises a display unit that displays the screen regarding the printing apparatus in case that the screen notification control is performed, and
wherein the voice control device comprises an output unit that outputs the audio regarding the printing apparatus in case that the voice notification control is performed.

2. The notification system according to claim 1, wherein the screen regarding the printing apparatus is a screen relating to an error occurring in the printing apparatus, and the audio regarding the printing apparatus is an audio relating to the error occurring in the printing apparatus.

3. The notification system according to claim 1, wherein the screen regarding the printing apparatus is a screen relating to a remaining level of a recording agent used in the printing apparatus, and
the audio regarding the printing apparatus is an audio relating to the remaining level of the recording agent used in the printing apparatus.

4. The notification system according to claim 1, wherein the screen regarding the printing apparatus is a screen indicating completion of the print processing executed by the printing apparatus, and
the audio regarding the printing apparatus is an audio indicating the completion of the print processing executed by the printing apparatus.

5. The notification system according to claim 1, wherein the screen regarding the printing apparatus is displayed on a display unit included in the printing apparatus based on receiving the voice indicating the predetermined instruction by the voice control device after the link processing and the sign-in are performed.

6. The notification system according to claim 1,
wherein information relating to an access point is transmitted from the mobile terminal to the voice control device,
wherein a connection between the voice control device and the access point is established based on receiving the information relating to the access point, and
wherein the screen notification control causing the mobile terminal that has displayed the input screen transmits the information relating to the access point to the voice control device.

7. The notification system according to claim 1,
wherein the one or more programs further includes instruction for:
causing, based on receiving a voice indicating a printing instruction by the voice control device after the link processing and the sign-in are performed, the printing apparatus to perform the print processing.

8. The notification system according to claim 7,
the voice indicating the predetermined instruction is the voice indicating the printing instruction.

9. The notification system according to claim 7, wherein the one or more programs further includes instruction for:
generating print data based on receiving the voice indicating the instruction by the voice control device after the link processing and the sign-in are performed,
wherein the generated print data is obtained by the printing apparatus.

10. The notification system according to claim 7, wherein the voice indicating the predetermined instruction is a voice indicating a state check instruction different from the voice indicating the printing instruction.

11. A server system comprising one or more servers, wherein the server system comprising:
one or more processors; and
one or more memories storing one or more programs configured to be executed by the one or more processors, the one or more programs including instructions for:
performing link processing for linking a printing apparatus that performs print processing and a predetermined user ID;
causing a mobile terminal, external to the printing apparatus and external to a server system, to display an input screen for inputting the predetermined user ID, wherein sign-in for using a print service is performed based on the predetermined user ID inputted on the input screen; and
performing, based on receiving a voice indicating a predetermined instruction by a voice control device, external to the printing apparatus, external to the mobile terminal and external to the server system, after the link processing and the sign-in are performed, both of (i) screen notification control causing the mobile terminal that has displayed the input screen to display a screen regarding the printing apparatus, and (ii) voice notification control causing the voice control device that has received the voice indicating the predetermined instruction to output audio regarding the printing apparatus.

12. The server system according to claim 11, wherein the screen regarding the printing apparatus is a screen relating to an error occurring in the printing apparatus, and
the audio regarding the printing apparatus is an audio relating to the error occurring in the printing apparatus.

13. The server system according to claim 11, wherein the screen regarding the printing apparatus is a screen relating to a remaining level of a recording agent used in the printing apparatus, and
the audio regarding the printing apparatus is an audio relating to the remaining level of the recording agent used in the printing apparatus.

14. The server system according to claim 11, wherein the screen regarding the printing apparatus is a screen indicating completion of the print processing executed by the printing apparatus, and the audio regarding the printing apparatus is an audio indicating the completion of the print processing executed by the printing apparatus.

15. The server system according to claim 11, wherein a screen regarding the printing apparatus is displayed on a display unit included in the printing apparatus based on receiving the voice indicating the predetermined instruction by the voice control device after the link processing and the sign-in are performed.

16. The server system according to claim 11,
wherein information relating to an access point is transmitted from the mobile terminal to the voice control device,
wherein a connection between the voice control device and the access point is established based on receiving the information relating to the access point, and
wherein the screen notification control causing the mobile terminal that displayed the input screen transmits the information relating the access point to the voice control device.

17. The server system according to claim 11,
wherein the one or more programs including further instruction for:
causing, based on receiving a voice indicating a printing instruction by the voice control device after the link processing and the sign-in are performed, the printing apparatus to perform print processing.

18. The server system according to claim 17,
the voice indicating the predetermined instruction is the voice indicating the printing instruction.

19. The server system according to claim 17,
wherein the one or more programs further includes instruction for:
generating print data based on receiving the voice indicating the instruction by the voice control device after the link processing and the sign-in are performed,
wherein the generated print data is obtained by the printing apparatus.

20. The server system according to claim 17, wherein the voice indicating the predetermined instruction is a voice indicating a state check instruction different from the voice indicating the printing instruction.

* * * * *